(12) United States Patent
Gilliam et al.

(10) Patent No.: US 8,069,116 B2
(45) Date of Patent: Nov. 29, 2011

(54) SYSTEM AND METHOD FOR SUPPLYING AND MANAGING USAGE RIGHTS ASSOCIATED WITH AN ITEM REPOSITORY

(75) Inventors: Charles Gilliam, Darien, CT (US); Xin Wang, Torrance, CA (US)

(73) Assignee: ContentGuard Holdings, Inc., Wilmington, DE (US)

(*) Notice: Subject to any disclaimer, the term of this patent is extended or adjusted under 35 U.S.C. 154(b) by 635 days.

(21) Appl. No.: 10/452,928

(22) Filed: Jun. 3, 2003

(65) Prior Publication Data

US 2004/0006542 A1 Jan. 8, 2004

Related U.S. Application Data

(63) Continuation-in-part of application No. 10/159,272, filed on Jun. 3, 2002, which is a continuation-in-part of application No. 10/046,695, filed on Jan. 17, 2002, application No. 10/452,928, which is a continuation-in-part of application No. 10/162,212, filed on Jun. 5, 2002, which is a continuation-in-part of application No. 09/867,745, filed on May 31, 2001, now Pat. No. 6,754,642.

(60) Provisional application No. 60/331,625, filed on Nov. 20, 2001, provisional application No. 60/296,117, filed on Jun. 7, 2001, provisional application No. 60/296,118, filed on Jun. 7, 2001, provisional application No. 60/296,113, filed on Jun. 7, 2001, provisional application No. 60/261,753, filed on Jan. 17, 2001, provisional application No. 60/331,624, filed on Nov. 20, 2001.

(51) Int. Cl.
*H04L 9/00* (2006.01)

(52) U.S. Cl. ............. 705/54; 713/155; 709/203

(58) Field of Classification Search ............ 713/200, 713/201, 159; 709/203; 705/54
See application file for complete search history.

(56) References Cited

U.S. PATENT DOCUMENTS 3,263,158 A 7/1966 Bargen et al.
(Continued)

FOREIGN PATENT DOCUMENTS

BR 9810967 A 10/2001
(Continued)

OTHER PUBLICATIONS

"National Semiconductor and EPR Partner for Information Metering/Data Security Cards" Mar. 4, 1994, Press Release from Electronic Publishing Resources, Inc.

(Continued)

*Primary Examiner* — Evens J Augustin
(74) *Attorney, Agent, or Firm* — Marc S. Kaufman; Stephen M. Hertzler; Reed Smith LLP

(57) ABSTRACT

A system and method for enforcing rights expressions, include specifying a repository rights expression indicating a manner of use of an item at a repository; and associating the repository rights expression with the repository. In a further embodiment, the system includes one or more repositories having associated therewith rights expressions further indicating a condition of use of the item at the repository. In a further embodiment, a repository for use in the system, includes a processor module configured to process the rights expression associated with the repository; and a determination module configured to determine based on the rights expression associated with the repository what action the repository is to take when the repository processes or receives a request for the item. The manner of use or condition of use indicates what action the repository is to take when the repository processes or receives a request for the item.

32 Claims, 8 Drawing Sheets

U.S. PATENT DOCUMENTS

| | | | |
|---|---|---|---|
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,200,700 A | 4/1980 | Mäder |
| 4,220,991 A | 9/1980 | Hamano et al. |
| 4,278,837 A | 7/1981 | Best |
| 4,323,921 A | 4/1982 | Guillou |
| 4,361,851 A | 11/1982 | Asip et al. |
| 4,423,287 A | 12/1983 | Zeidler |
| 4,429,385 A | 1/1984 | Cichelli et al. |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,621,321 A | 11/1986 | Boebert et al. |
| 4,644,493 A | 2/1987 | Chandra et al. |
| 4,658,093 A | 4/1987 | Hellman |
| 4,713,753 A | 12/1987 | Boebert et al. |
| 4,736,422 A | 4/1988 | Mason |
| 4,740,890 A | 4/1988 | William |
| 4,796,220 A | 1/1989 | Wolfe |
| 4,816,655 A | 3/1989 | Musyck et al. |
| 4,817,140 A | 3/1989 | Chandra et al. |
| 4,827,508 A | 5/1989 | Shear |
| 4,868,376 A | 9/1989 | Lessin et al. |
| 4,888,638 A | 12/1989 | Bohn |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,164 A | 10/1991 | Elmer et al. |
| 5,103,476 A | 4/1992 | Waite et al. |
| 5,113,519 A | 5/1992 | Johnson et al. |
| 5,129,083 A | 7/1992 | Cutler et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,174,641 A | 12/1992 | Lim |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,287,408 A | 2/1994 | Samson |
| 5,291,596 A | 3/1994 | Mita |
| 5,293,422 A | 3/1994 | Loiacono |
| 5,301,231 A | 4/1994 | Abraham et al. |
| 5,311,591 A | 5/1994 | Fischer |
| 5,319,705 A | 6/1994 | Halter et al. |
| 5,335,275 A | 8/1994 | Millar et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,386,369 A | 1/1995 | Christiano |
| 5,390,297 A | 2/1995 | Barber et al. |
| 5,394,469 A | 2/1995 | Nagel et al. |
| 5,410,598 A | 4/1995 | Shear |
| 5,412,717 A | 5/1995 | Fischer |
| 5,414,852 A | 5/1995 | Kramer et al. |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,485,577 A | 1/1996 | Eyer et al. |
| 5,499,298 A | 3/1996 | Narasimhalu et al. |
| 5,502,766 A | 3/1996 | Boebert et al. |
| 5,504,814 A | 4/1996 | Miyahara |
| 5,504,816 A | 4/1996 | Hamilton et al. |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,535,276 A | 7/1996 | Ganesan |
| 5,539,735 A | 7/1996 | Moskowitz |
| 5,553,143 A | 9/1996 | Ross et al. |
| 5,557,678 A | 9/1996 | Ganesan |
| 5,563,946 A | 10/1996 | Cooper et al. |
| 5,564,038 A | 10/1996 | Grantz et al. |
| 5,568,552 A | 10/1996 | Davis |
| 5,619,570 A | 4/1997 | Tsutsui |
| 5,621,797 A | 4/1997 | Rosen |
| 5,625,690 A | 4/1997 | Michel et al. |
| 5,629,980 A * | 5/1997 | Stefik et al. ..................... 705/54 |
| 5,633,932 A | 5/1997 | Davis et al. |
| 5,634,012 A | 5/1997 | Stefik et al. |
| 5,636,346 A | 6/1997 | Saxe |
| 5,638,443 A | 6/1997 | Stefik et al. |
| 5,638,513 A | 6/1997 | Ananda |
| 5,649,013 A | 7/1997 | Stuckey et al. |
| 5,655,077 A | 8/1997 | Jones et al. |
| 5,673,316 A | 9/1997 | Auerbach et al. |
| 5,708,709 A | 1/1998 | Rose |
| 5,708,717 A | 1/1998 | Alasia |
| 5,715,403 A | 2/1998 | Stefik |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,745,604 A * | 4/1998 | Rhoads ........................ 382/232 |
| 5,745,879 A | 4/1998 | Wyman |
| 5,748,783 A | 5/1998 | Rhoads |
| 5,757,907 A | 5/1998 | Cooper et al. |
| 5,758,069 A | 5/1998 | Olsen |
| 5,761,686 A | 6/1998 | Bloomberg |
| 5,764,807 A | 6/1998 | Pearlman et al. |
| 5,765,152 A | 6/1998 | Erickson |
| 5,768,426 A | 6/1998 | Rhoads |
| 5,778,065 A * | 7/1998 | Hauser et al. ................. 713/155 |
| 5,784,173 A * | 7/1998 | Jinnai ........................ 358/403 |
| 5,787,172 A | 7/1998 | Arnold |
| 5,790,664 A * | 8/1998 | Coley et al. .................... 709/203 |
| 5,790,677 A | 8/1998 | Fox et al. |
| 5,794,207 A | 8/1998 | Walker et al. |
| 5,812,664 A | 9/1998 | Bernobich et al. |
| 5,822,436 A * | 10/1998 | Rhoads ........................ 380/54 |
| 5,825,876 A | 10/1998 | Peterson |
| 5,825,879 A | 10/1998 | Davis |
| 5,825,892 A | 10/1998 | Braudaway et al. |
| 5,832,119 A * | 11/1998 | Rhoads ........................ 382/232 |
| 5,835,899 A * | 11/1998 | Rose et al. ..................... 705/34 |
| 5,838,792 A | 11/1998 | Ganesan |
| 5,841,886 A * | 11/1998 | Rhoads ........................ 382/115 |
| 5,848,154 A | 12/1998 | Nishio et al. |
| 5,848,378 A | 12/1998 | Shelton et al. |

| | | |
|---|---|---|
| 5,850,443 A | 12/1998 | Van Oorschot et al. |
| 5,862,260 A * | 1/1999 | Rhoads .................... 382/232 |
| 5,884,280 A * | 3/1999 | Yoshioka et al. .......... 705/26.1 |
| 5,892,825 A * | 4/1999 | Mages et al. ................ 705/51 |
| 5,892,900 A * | 4/1999 | Ginter et al. ................ 726/26 |
| 5,893,132 A * | 4/1999 | Huffman et al. ............ 715/201 |
| 5,896,176 A | 4/1999 | Das et al. |
| 5,903,701 A * | 5/1999 | Lydecker et al. .......... 386/263 |
| 5,905,981 A * | 5/1999 | Lawler ...................... 715/201 |
| 5,910,987 A * | 6/1999 | Ginter et al. ................ 705/52 |
| 5,915,019 A * | 6/1999 | Ginter et al. ................ 705/54 |
| 5,917,912 A * | 6/1999 | Ginter et al. .............. 713/187 |
| 5,918,215 A * | 6/1999 | Yoshioka et al. ........... 705/30 |
| 5,920,861 A * | 7/1999 | Hall et al. ....................... 1/1 |
| 5,933,498 A * | 8/1999 | Schneck et al. ............. 705/54 |
| 5,940,504 A | 8/1999 | Griswold |
| 5,943,422 A * | 8/1999 | Van Wie et al. ............. 705/54 |
| 5,949,876 A * | 9/1999 | Ginter et al. ................ 705/80 |
| 5,956,034 A * | 9/1999 | Sachs et al. ................ 715/776 |
| 5,982,891 A * | 11/1999 | Ginter et al. ................ 705/54 |
| 5,987,134 A | 11/1999 | Shin et al. |
| 5,991,876 A * | 11/1999 | Johnson et al. ............. 726/28 |
| 5,999,624 A | 12/1999 | Hopkins |
| 5,999,949 A | 12/1999 | Crandall |
| 6,006,332 A * | 12/1999 | Rabne et al. .................. 726/6 |
| 6,012,143 A * | 1/2000 | Tanaka ......................... 726/20 |
| 6,020,882 A | 2/2000 | Kinghorn et al. |
| 6,026,369 A * | 2/2000 | Capek ..................... 705/14.54 |
| 6,047,067 A | 4/2000 | Rosen |
| 6,052,717 A * | 4/2000 | Reynolds et al. ........... 709/218 |
| 6,052,780 A * | 4/2000 | Glover ........................ 713/193 |
| 6,073,234 A | 6/2000 | Kigo et al. |
| 6,073,256 A * | 6/2000 | Sesma ......................... 714/38.1 |
| 6,076,166 A | 6/2000 | Moshfeghi et al. |
| 6,091,777 A | 7/2000 | Guetz et al. |
| 6,098,056 A * | 8/2000 | Rusnak et al. ................ 705/75 |
| 6,105,131 A * | 8/2000 | Carroll ........................ 713/155 |
| 6,111,954 A * | 8/2000 | Rhoads .......................... 380/54 |
| 6,112,181 A * | 8/2000 | Shear et al. .................. 705/7.29 |
| 6,112,239 A | 8/2000 | Kenner et al. |
| 6,115,471 A | 9/2000 | Oki et al. |
| 6,122,392 A * | 9/2000 | Rhoads ........................ 382/100 |
| 6,122,403 A * | 9/2000 | Rhoads ........................ 382/233 |
| 6,125,349 A | 9/2000 | Maher |
| 6,135,646 A | 10/2000 | Kahn et al. |
| 6,138,119 A | 10/2000 | Hall et al. |
| 6,141,754 A | 10/2000 | Choy |
| 6,157,719 A | 12/2000 | Wasilewski et al. |
| 6,157,721 A | 12/2000 | Shear et al. |
| 6,158,010 A | 12/2000 | Moriconi et al. |
| 6,169,976 B1 | 1/2001 | Colosso |
| 6,185,683 B1 | 2/2001 | Ginter et al. |
| 6,189,037 B1 | 2/2001 | Adams et al. |
| 6,189,146 B1 | 2/2001 | Misra et al. |
| 6,209,092 B1 | 3/2001 | Linnartz |
| 6,216,112 B1 | 4/2001 | Fuller et al. |
| 6,219,652 B1 | 4/2001 | Carter et al. |
| 6,226,618 B1 | 5/2001 | Downs et al. |
| 6,233,166 B1 | 5/2001 | Tarodo |
| 6,233,684 B1 | 5/2001 | Stefik et al. |
| 6,236,971 B1 | 5/2001 | Stefik et al. |
| 6,236,996 B1 | 5/2001 | Bapat et al. |
| 6,237,786 B1 | 5/2001 | Ginter et al. |
| 6,240,185 B1 | 5/2001 | Van Wie et al. |
| 6,240,401 B1 | 5/2001 | Oren et al. |
| 6,253,193 B1 | 6/2001 | Ginter et al. |
| 6,292,569 B1 | 9/2001 | Shear et al. |
| 6,301,660 B1 | 10/2001 | Benson |
| 6,307,939 B1 | 10/2001 | Vigarie |
| 6,327,652 B1 | 12/2001 | England et al. |
| 6,330,670 B1 | 12/2001 | England et al. |
| 6,345,256 B1 | 2/2002 | Milsted et al. |
| 6,353,888 B1 | 3/2002 | Kakehi et al. |
| 6,360,206 B1 | 3/2002 | Yamashita |
| 6,363,488 B1 | 3/2002 | Ginter et al. |
| 6,385,596 B1 | 5/2002 | Wiser et al. |
| 6,389,402 B1 | 5/2002 | Ginter et al. |
| 6,397,333 B1 | 5/2002 | Söhne et al. |
| 6,401,211 B1 | 6/2002 | Brezak, Jr. et al. |
| 6,405,369 B1 | 6/2002 | Tsuria |
| 6,424,717 B1 | 7/2002 | Pinder et al. |
| 6,424,947 B1 | 7/2002 | Tsuria et al. |
| 6,487,659 B1 | 11/2002 | Kigo et al. |
| 6,516,052 B2 | 2/2003 | Voudouris |
| 6,516,413 B1 | 2/2003 | Aratani et al. |
| 6,523,745 B1 | 2/2003 | Tamori |
| 6,796,555 B1 | 9/2004 | Blahut |
| 2001/0009026 A1 | 7/2001 | Terao et al. |
| 2001/0011276 A1 | 8/2001 | Durst, Jr. et al. |
| 2001/0014206 A1 | 8/2001 | Artigalas et al. |
| 2001/0037467 A1 | 11/2001 | O'Toole, Jr. et al. |
| 2001/0039659 A1 | 11/2001 | Simmons et al. |
| 2002/0001387 A1 | 1/2002 | Dillon |
| 2002/0035618 A1 | 3/2002 | Mendez et al. |
| 2002/0044658 A1 | 4/2002 | Wasilewski et al. |
| 2002/0056118 A1 | 5/2002 | Hunter et al. |
| 2002/0069282 A1 | 6/2002 | Reisman |
| 2002/0099948 A1 | 7/2002 | Kocher et al. |
| 2002/0127423 A1 | 9/2002 | Kayanakis |
| 2003/0097567 A1 | 5/2003 | Terao et al. |
| 2004/0052370 A1 | 3/2004 | Katznelson |
| 2004/0172552 A1 | 9/2004 | Boyles et al. |

FOREIGN PATENT DOCUMENTS

| | | |
|---|---|---|
| EP | 0 067 556 B1 | 12/1982 |
| EP | 0 084 441 | 7/1983 |
| EP | 0 180 460 | 5/1986 |
| EP | 0 257 585 A2 | 3/1988 |
| EP | 0 262 025 A2 | 3/1988 |
| EP | 0 332 304 A2 | 9/1989 |
| EP | 0 332 707 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 651 554 | 5/1995 |
| EP | 0 668 695 | 8/1995 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0 725 376 | 8/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 103 922 A2 | 5/2001 |
| GB | 1483282 | 8/1977 |
| GB | 2022969 A | 12/1979 |
| GB | 2 136 175 | 9/1984 |
| GB | 2 236 604 | 4/1991 |
| GB | 2236604 A | 4/1991 |
| GB | 2309364 A | 7/1997 |
| GB | 2316503 A | 2/1998 |
| GB | 2354102 A | 3/2001 |
| JP | 62-241061 | 10/1987 |
| JP | 64-068835 | 3/1989 |
| JP | 3063717 A | 3/1991 |
| JP | 04-369068 | 12/1992 |
| JP | 5-100939 | 4/1993 |
| JP | 5168039 A2 | 7/1993 |
| JP | 05-268415 | 10/1993 |
| JP | 6131371 A | 5/1994 |
| JP | 06-175794 | 6/1994 |
| JP | 06-215010 | 8/1994 |
| JP | 7-36768 | 2/1995 |
| JP | 07-084852 | 3/1995 |
| JP | 07-200317 | 8/1995 |
| JP | 07-244639 | 9/1995 |
| JP | 0 715 241 | 6/1996 |
| JP | 11031130 A2 | 2/1999 |
| JP | 11032037 A2 | 2/1999 |
| JP | 11205306 A2 | 7/1999 |

| | | | |
|---|---|---|---|
| JP | 11215121 A2 | 8/1999 |
| JP | 11237969 | 8/1999 |
| JP | 2000-076339 | 3/2000 |
| JP | 2000215165 A2 | 8/2000 |
| JP | 2000-357195 | 12/2000 |
| JP | 2001-202437 | 7/2001 |
| JP | 2001202437 | 7/2001 |
| JP | 2002-140630 | 5/2002 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 | 11/1992 |
| WO | WO 92/20022 A1 | 11/1992 |
| WO | WO 93/01550 | 1/1993 |
| WO | WO 93/01550 A1 | 1/1993 |
| WO | WO 93/11480 A1 | 6/1993 |
| WO | WO 94/01821 | 1/1994 |
| WO | WO 94/03003 A1 | 2/1994 |
| WO | WO 96/13814 A1 | 5/1996 |
| WO | WO 96/24092 | 8/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 97/48203 | 12/1997 |
| WO | WO 98/09209 A1 | 3/1998 |
| WO | WO 98/10561 A1 | 3/1998 |
| WO | WO 98/11690 | 3/1998 |
| WO | WO 98/11690 A1 | 3/1998 |
| WO | WO 98/19431 A1 | 5/1998 |
| WO | WO 98/42098 | 9/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/49615 | 9/1999 |
| WO | WO 99/60461 A1 | 11/1999 |
| WO | WO 99/60750 A2 | 11/1999 |
| WO | WO 00/04727 | 1/2000 |
| WO | WO 00/04727 A2 | 1/2000 |
| WO | WO 00/05898 A2 | 2/2000 |
| WO | WO 00/08909 | 2/2000 |
| WO | WO 00/39733 | 7/2000 |
| WO | WO 00/46994 A1 | 8/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01/37209 A1 | 5/2001 |
| WO | WO 01/63528 | 8/2001 |
| WO | WO 2004/034223 A2 | 4/2004 |
| WO | WO 2004/103843 | 12/2004 |

OTHER PUBLICATIONS

Weber, R., "Digital Rights Management Technology" Oct. 1995.
Flasche, U. et aL, "Decentralized Processing of Documents", pp. 119-131, 1986, Comput. & Graphics, vol. 10, No. 2.
Mori, R. et al., "Superdistribution: The Concept and the Architecture", pp. 1133-1146, 1990. The Transactions of the IEICE, Vo. E 73, No. 7, Tokyo, JP.
Weber, R., "Metering Technologies for Digital Intellectual Property", pp. 1-29, Oct. 1994, A Report to the International Federation of Reproduction Rights Organizations.
Clark, P.C. et al., "Bits: A Smartcard protected Operating System", pp. 66-70 and 94, Nov. 1994, Communications of the ACM, vol. 37, No. 11.
Ross, P.E., "Data Guard", pp. 101, Jun. 6, 1994, Forbes.
Saigh, W.K., "Knowledge is Sacred", 1992, Video Pocket/Page Reader Systems, Ltd.
Kahn, R.E., "Deposit, Registration and Recordation in an Electronic Copyright Management System", pp. 1-19, Aug. 1992, Corporation for National Research Initiatives, Virginia.
Hilts, P. et al., "Books While U Wait", pp. 48-50, Jan. 3, 1994, Publishers Weekly.
Strattner, A, "Cash Register on a Chip may Revolutionaize Software Pricing and Distribution; Wave Systems Corp.", pp. 1-3, Apr. 1994, Computer Shopper, vol. 14, No. 4, ISSN 0886-0556.
O'Conner, M., "New Distribution Option for Electronic Publishers; iOpener Data Encryption and Metering System for CD-ROM use; Column", pp. 1-6, Mar. 1994, CD-ROM Professional, vol. 7, No. 2, ISSN: 1409-0833.
Willett, S., "Metered PCs: Is Your System Watching You? Wave System beta tests new technology", pp. 84, May 2, 1994, InfoWorld.
Linn, R., "Copyright and Information Services in the Context of the National Research and Education Network", pp. 9-20, Jan. 1994, IMA Intellectual Property Project Proceedings, vol. 1, Issue 1.
Perrit, Jr., H., "Permission Headers and Contract Law", pp. 27-48, Jan. 1994, IMA Intellectual Property Project Proceedings, vol. 1, Issue 1.
Upthegrove, L., "Intellectual Property Header Descriptors: A Dynamic Approach", pp. 63-66, Jan. 1994, IMA Intellectual Property Proceedings, vol. 1, Issue 1.
Sirbu, M., "Internet Billing Service Design and prototype Implementation", pp. 67-80 Jan. 1994, IMA Intellectual Property Project Proceedings, vol. 1, Issue 1.
Simmell, S. et al., "Metering and Licensing of Resources: Kala's General Purpose Approach", pp. 81-110, Jan. 1994, IMA Intellectual Property Project Proceedings, vol. 1, Issue 1.
Kahn, R., "Deposit, Registration and Recordation in an Electronic Copyright Management System", pp. 111-120, Jan. 1994, IMA Intellectual Property Project Proceedings, vol. 1, Issue 1.
Tygar, J. et al., "Dyad: A System for Using Physically Secure Coprocessors", pp. 121-152, Jan. 1994, IMA Intellectual Property Project Proceedings, vol. 1, Issue 1.
Griswold, G., "A Method for Protecting Copyright on Networks", pp. 169-178, Jan. 1994, IMA Intellectual Property Project Proceedings, vol. 1, Issue 1.
Nelson, T., "A Publishing and Royalty Model for Networked Documents", pp. 257-259, Jan. 1994, IMA Intellectual Property Project Proceedings, vol. 1, Issue 1.
Robinson, E., "Redefining Mobile Computing", pp. 238-240, 247-248 and 252, Jul. 1993, PC Computing.
Abadi, M. et al., "Authentication and Delegation with Smart-cards", pp. 1-24, 1990, Research Report DEC Systems Research Center.
Mark Stefik, "Letting Loose the Light: Igniting Commerce in Electronic Publication", pp. 219-253, 1996, Internet Dreams: Archetypes, Myths, and Metaphors, IDSN 0-262-19373-6.
Mark Stefik, "Letting Loose the Light: Igniting Commerce in Electronic Publication", pp. 2-35, Feb. 8, 1995, Internet Dreams: Archetypes, Myths and Metaphors.
Henry H. Perritt, Jr., "Technological Strategies for Protecting Intellectual Property in the Networked Multimedia Environment", Apr. 2-3, 1993, Knowbots, Permissions Headers & Contract Law.
International Search Report dated Feb. 13, 2004 for PCT/US03/05840.
International Search Report Dated Feb. 11, 2004.
European Search Report dated Jul. 20, 2004 in EP 02 70 1056.
Blaze et al, "Divertible Protocols and Atomic Proxy Cryptography" 1998 Advances in Cryptography—Euro Crypt International Conference on the Theory and Application of Crypto Techniques, Springer Verlag, DE.
Blaze et al, "Atomic Proxy Cryptography" Draft (Online) (Nov. 2, 1997) XP002239619 Retrieved from the Internet.
No Author, "Capability- and Object-Based Systems Concepts," Capability-Based Computer Systems, pp. 1-19 (no date).
Cox, "Superdistribution" Wired Magazine (Sep. 1994) XP002233405 URL:http://www.wired.com/wired/archive/2.09/superdis_pr.html>.
Dunlop et al, Telecommunications Engineering, pp. 346-352 (1984).
Elgamal, "A Public Key Cryptosystem and a Signature Scheme Based on Discrete Logarithms," IEEE Transactions on Information Theory IT-31(4):469-472 (Jul. 1985).
Gheorghiu et al., "Authorization for Metacomputing Applications" (no date).

Lannella, ed., Open Digital Rights Language (ODRL), pp. 1-31 (Nov. 21, 2000).

Kahle, wais.concepts.txt, Wide Area Information Server Concepts, Thinking Machines Version 4, Draft, pp. 1-18 (Nov. 3, 1989).

Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.

Kahn et al, "The Digital Library Project, vol. 1: The World of Knowbots (Draft), An Open Architecture for a Digital Library System and a Plan for its Development," Corporation for National Research Initiatives, pp. 1-48 (Mar. 1988).

Kohl et al, Network Working Group Request for Comments: 1510, pp. 1-112 (Sep. 1993).

Lee et al, CDMA Systems Engineering Handbook (1998) [excerpts but not all pages numbered].

Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.

Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.

Microsoft Word, Users Guide, Version 6.0, pp. 487-489, 549-555, 560-564, 572-575, 599-613, 616-631 (1993).

Ojanperä and Prasad, eds., Wideband CDMA for Third Generation Mobile Communications (1998) [excerpts but not all pages numbered].

Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).

Raggett, (Hewlett Packard), "HTML+(Hypertext markup language)," pp. 1-31 (Jul. 12, 1993) URL:http://citeseer.ist.psu.edu/correct/340709.

Samuelson et al, "Intellectual Property Rights for Digital Library and Hypertext Publishing Systems: An Analysis of Xanadu," Hypertext '91 Proceedings, pp. 39-50 (Dec. 1991).

No Author, "Softlock Services Introduces . . . Softlock Services" Press Release (Jan. 28, 1994).

No Author, "Appendix III—Compatibility with HTML," No Title, pp. 30-31 (no date).

No Editor, No Title, Dictionary pages, pp. 469-472, 593-594 (no date).

Benoit, Digital Television MPEG-1, MPEG-2 and Principles of the DVB System, pp. 75-80, 116-121 (no date).

Benoit, Digital Television MPEG-1, MPEG-2 and Principles of the DVB System, $2^{nd}$ edition, pp. 74-80 (no date).

AH Digital Audio and Video Series, "DTV Receivers and Measurements," Understanding Digital Terrestrial Broadcasting, pp. 159-164 (no date).

O'Driscoll, The Essential Guide to Digital Set-Top Boxes and Interactive TV, pp. 6-24 (no date).

Ius Mentis, "The ElGamal Public Key System," pp. 1-2 (Oct. 1, 2005) online at http://www.iusmentis.com/technology/encyrption/elgamal/.

Schneier, "Crypto Bibliography," Index of Crypto Papers Available Online, pp. 1-2 (online) (no date).

No Author, No Title, pp. 344-355 (no date).

No Author, "Part Four Networks," No Title, pp. 639-714 (no date).

Microsoft Word User's Guide, pp. 773-774, 315-316, 487-489, 561-564, 744, 624-633 (1993).

No Author, "What is the ElGamal Cryptosystem," p. 1 (Nov. 27, 2006) online at http://www.x5.net/faqs/crypto/q29.html.

Johnson et al., "A Secure Distributed Capability Based System," ACM, pp. 392-402 (1985).

Wikipedia, "El Gamal Encryption," pp. 1-3 (last modified Nov. 2, 2006) online at http://en.wikipedia.org/wiki/ElGamal_encryption.

Blaze, "Atomic Proxy Cryptography," p. 1 Abstract (Oct. 20, 1998).

Blaze, "Matt Blaze's Technical Papers," pp. 1-6 (last updated Aug. 6, 2006)].

Online Search Results for "inverted file", "inverted index" from www.techweb.com, www.cryer.co.uk, computing-dictionary.thefreedictionary.com, www.nist.gov, en.wikipedia.org, www.cni.org, www.tiscali.co.uk (Jul. 15-16, 2006).

Corporation for National Research Initiatives, "Digital Object Architecture Project", http://www.nnri.reston.va.us/doa.html (updated Nov. 28, 2006).

Stefik, Summary and Analysis of A13 (Kahn, Robert E and Vinton G Cerf, "The Digital Library Project, vol. 1: The World of Knowbots (Draft), An Open Architecture for a Digital Library System and a Plan for its Development," Corporation for National Research Initiatives (Mar. 1988)), pp. 1-25 (May 30, 2007).

Johnson et al., "A Secure Distributed Capability Based System," Proceedings of the 1985 ACM Annual Conference on the Range of Computing: Mid-80's Perspective: Mid-80's Perspective *Association for Computing Machinery* pp. 392-402 (1985).

Delaigle, "Digital Watermarking," SPIE Conference in Optical Security and Counterfeit Deterrence Techniques, San Jose, CA (Feb. 1996).

Perritt, "Technologies Strategies for Protecting Intellectual Property in the Networked Multimedia Environment," Knowbots, Permissions Headers and Contract Law (Apr. 2-3 1993).

Contentguard: "ContentGuard XrML Software Development kit User's Guide Release 2.0", Internet Citation, Nov. 30, 2001, XP002333477.

"The C++ Programming Language—Second Edition", Bjarne Stroustrup, Addison-Wesley, ISBN 0-201-53992-6, 1991.

* cited by examiner

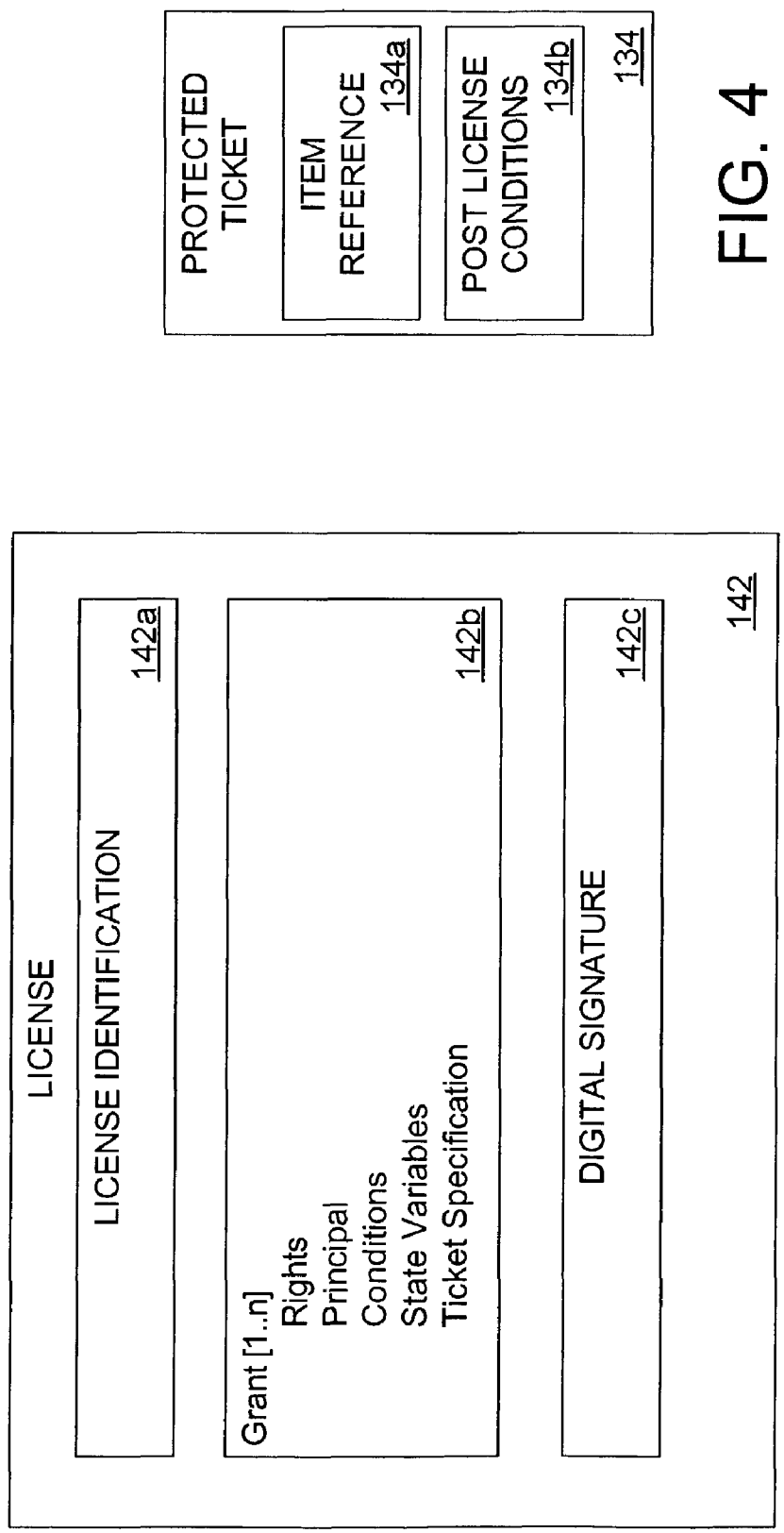

SYSTEM AND METHOD FOR SUPPLYING AND MANAGING USAGE RIGHTS ASSOCIATED WITH AN ITEM REPOSITORY

CROSS REFERENCE TO RELATED DOCUMENTS

The present invention claims benefit of priority to and is a continuation-in-part of commonly assigned, co-pending, U.S. patent application Ser. No. 10/159,272 of Wang et al, entitled "METHOD AND APPARATUS FOR DISTRIBUTING ENFORCEABLE PROPERTY RIGHTS," filed Jun. 3, 2002, which claims benefit of priority to U.S. Provisional Patent Applications Ser. No. 60/331,625, filed on Nov. 20, 2001, No. 60/296,117, filed on Jun. 7, 2001, No. 60/296,118, filed on Jun. 7, 2001, and No. 60/296,113, filed on Jun. 7, 2001, and which is a continuation-in-part of commonly assigned, co-pending, U.S. patent application Ser. No. 10/046,695, filed on Jan. 17, 2002, which claims benefit of priority to U.S. Provisional Patent Application Ser. No. 60/261,753, filed on Jan. 17, 2001, the entire disclosures of all of which are hereby incorporated by reference herein.

The present invention further claims benefit of priority to and is a continuation-in-part of commonly assigned, co-pending, U.S. patent application Ser. No. 10/162,212 of Wang, entitled "RIGHTS OFFERING AND GRANTING," filed Jun. 5, 2002, which claims benefit of priority to U.S. Provisional Patent Applications Serial No. 60/296,113, filed in Jun. 7, 2001, No. 60/331,625, filed on Nov. 20, 2001, and No. 60/331,624 filed, on Nov. 20, 2001, and which is a continuation-in-part of commonly assigned, co-pending, U.S. patent application Ser. No. 09/867,745, filed on May 31, 2001, the entire disclosures of all of which are hereby incorporated by reference herein.

BACKGROUND OF THE INVENTION

1. Field of the Invention

The exemplary embodiments of the present invention generally relate to systems and methods for Digital Rights Management, and more particularly to a system and method for supplying and managing rights expressions.

2. Description of Related Art

One of the most important needs to enable the development of widespread distribution of digital works, for example, documents or other content in forms readable by computers, and management of the use of digital works via electronic means, and the Internet in particular, is the ability to designate and enforce the intellectual property rights and other rights of content owners, consumers and other stakeholders during the distribution and use of digital works. Efforts to meet this need have been termed Intellectual Property Rights Management (IPRM), Digital Property Rights Management (DPRM), Intellectual Property Management (IPM), Rights Management (RM), and Electronic Copyright Management (ECM), collectively referred to as Digital Rights Management (DRM) herein. There are a number of issues to be considered in effecting a DRM System. For example, authentication, authorization, accounting, payment and financial clearing, rights specification, rights verification, rights enforcement, and document protection issues should be addressed. Commonly-assigned U.S. Pat. Nos. 5,530,235, 5,629,980, 5,634,012, 5,638,443, 5,715,403, 6,233,684, and 6,236,971, the entire disclosures of all of which are hereby incorporated by reference herein, disclose DRM systems addressing these and other issues.

For example, U.S. Pat. No. 5,634,012 discloses a system for controlling the distribution of digital documents. Each rendering device has a repository associated therewith. A predetermined set of usage transaction steps define a protocol used by the repositories for enforcing usage rights associated with a document. Usage rights persist with the document content. The usage rights can permit various manners of use of the content, such as viewing only, use once, distribution, and the like. Usage rights can be contingent on payment or satisfaction of other conditions and variables. Conceptually, a repository can include a set of functional specifications defining core functionality. A repository can include a trusted system in that the repository can maintain physical integrity, communications integrity and behavioral integrity. A repository can be removable or stationary, can be big or small or portable, can be in any suitable shape, such as a card or smart card, or can have other functionalities, such as a microprocessor.

The use and distribution of digital content, for example, documents or other information that can be rendered by a computer or other device, can be controlled using usage rights and conditions. This permits digital content to be distributed in a flexible manner while protecting the rights of the content owner and permitting the content owner, and others adding value to transactions, to produce a revenue stream from the distribution. However, tangible items, such as goods and services, typically cannot be distributed in such a flexible manner.

Auctions, reverse auctions, aggregation mechanisms, and other distribution models can be used to distribute goods and services in a more flexible manner. For example, U.S. Pat. No. 5,897,620 discloses a system for matching a destination and unspecified-time with an airline flight to permit airlines to fill otherwise empty seats. However, the disclosed system merely matches a traveler with an airline ticket and typically does not permit the flexible distribution of various services and goods.

U.S. Pat. No. 6,041,308 discloses a system for encouraging buyers to submit Conditional Purchase Offers (CPOs) to a CPO management system for a desired product. The CPO management system processes each received CPO to determine whether one or more sellers are willing to accept a given CPO. While this system can be applied to more diverse goods and services, the disclosed system also is merely a mechanism for matching buyers to sellers.

Notwithstanding new business models and approaches to selling various goods and services, such as those discussed above, the sale and exchange of goods and services typically still relies on legal theories and relationships for enforcing behavior. For example, the parties to each transaction ultimately have to agree, either directly or indirectly, on the parameters for delivering the goods and services, such as price, quantities, and the item identity. Accordingly, trade of goods and services can be restrained by legal and relationship issues. Additionally, there is a need for business models and information technology systems to recognize that there are stakeholders in addition to content owners and consumers.

SUMMARY OF THE INVENTION

Therefore, there is a need for a system and method that allows for the trade of goods and services, unrestrained by legal and relationship issues. In addition, there is a need for a system and method that recognize stakeholders in addition to content owners and consumers. The above and other needs are addressed by the exemplary embodiments of the present invention, which provide an improved system and method for supplying and managing rights expressions.

Accordingly, in one aspect of an embodiment of the present invention, there is provided a method for enforcing rights expressions specifying manners of use of an item, including specifying by a potential recipient of an item a first rights expression indicating a first manner of use of the item proposed by the recipient; specifying by a provider of the item a second rights expression indicating a second manner of use of the item proposed by the provider; determining if there is a correspondence between the first rights expression and the second rights expression; and applying a rule to a determined correspondence between the first rights expression and the second rights expression to determine if the recipient should be granted use of the item.

In another aspect of an embodiment of the present invention, there is provided a system for enforcing rights expressions specifying manners of use of an item, including means for specifying by a potential recipient of an item a first rights expression indicating a first manner of use of the item proposed by the recipient; means for specifying by a provider of the item a second rights expression indicating a second manner of use of the item proposed by the provider; means for determining if there is a correspondence between the first rights expression and the second rights expression; and means for applying a rule to a determined correspondence between the first rights expression and the second rights expression to determine if the recipient should be granted use of the item.

In another aspect of an embodiment of the present invention, there is provided a method for enforcing rights specifying manners of use of an item, including specifying by a recipient of an item a first rights expression indicating at least on of a desired manner of use of the item by the recipient and a condition of use of the item by the recipient; associating the rights expression with the item; and supplying the item to the recipient based on satisfaction of at least one of the desired manner of use of the item by the recipient and the condition of use of the item by the recipient.

In another aspect of an embodiment of the present invention, there is provided a system for enforcing rights specifying manners of use of an item, including means for specifying by a recipient of an item a first rights expression indicating at least on of a desired manner of use of the item by the recipient and a condition of use of the item by the recipient; means for associating the rights expression with the item; and means for supplying the item to the recipient based on satisfaction of at least one of the desired manner of use of the item by the recipient and the condition of use of the item by the recipient.

In another aspect of an embodiment of the present invention, there is provided a method for enforcing rights expressions specifying manners of use of an item, including specifying a repository rights expression indicating a manner of use of an item at a repository; and associating the repository rights expression with the repository. The manner of use indicates at least one of what action the repository is to take when the repository processes the item and what action the repository is to take when the repository receives a request for the item.

In another aspect of an embodiment of the present invention, there is provided a system for enforcing rights expressions specifying manners of use of an item, including means for specifying a repository rights expression indicating a manner of use of an item at a repository; and means for associating the repository rights expression with the repository. The manner of use indicates at least one of what action the repository is to take when the repository processes the item and what action the repository is to take when the repository receives a request for the item.

In another aspect of an embodiment of the present invention, there is provided a system for enforcing rights expressions specifying manners of use of an item, including one or more repositories having associated therewith one or more rights expressions indicating at least one of a manner of use and a condition of use of an item at a repository. The manner of use and condition of use indicates at least one of what action the repository is to take when the repository processes the item and what action the repository is to take when the repository receives a request for the item.

In another aspect of an embodiment of the present invention, there is provided a repository for use in a system for enforcing rights expressions specifying manners of use of an item, including a processor module configured to process a rights expressions associated with the repository and indicating at least one of a manner of use and a condition of use of an item at the repository; and a determination module configured to determine based on the rights expression associated with the repository at least one of what action the repository is to take when the repository processes the item and what action the repository is to take when the repository receives a request for the item.

Still other aspects, features, and advantages of the present invention are readily apparent from the following detailed description, simply by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates an exemplary license that can be employed in the exemplary systems of FIGS. 1 and 5-7;

FIG. 4 illustrates an exemplary item ticket that can be employed in the exemplary systems of FIGS. 1 and 5-7;

DETAILED DESCRIPTION OF THE EXEMPLARY EMBODIMENTS

A system and method for supplying and managing rights expressions are described. In the following description, for purposes of explanation, numerous specific details are set forth in order to provide a thorough understanding of the present invention. It is apparent to one skilled in the art, however, that the present invention can be practiced without these specific details or with equivalent arrangements. In some instances, well-known structures and devices are shown in block diagram form in order to avoid unnecessarily obscuring the present invention.

Figure 1:
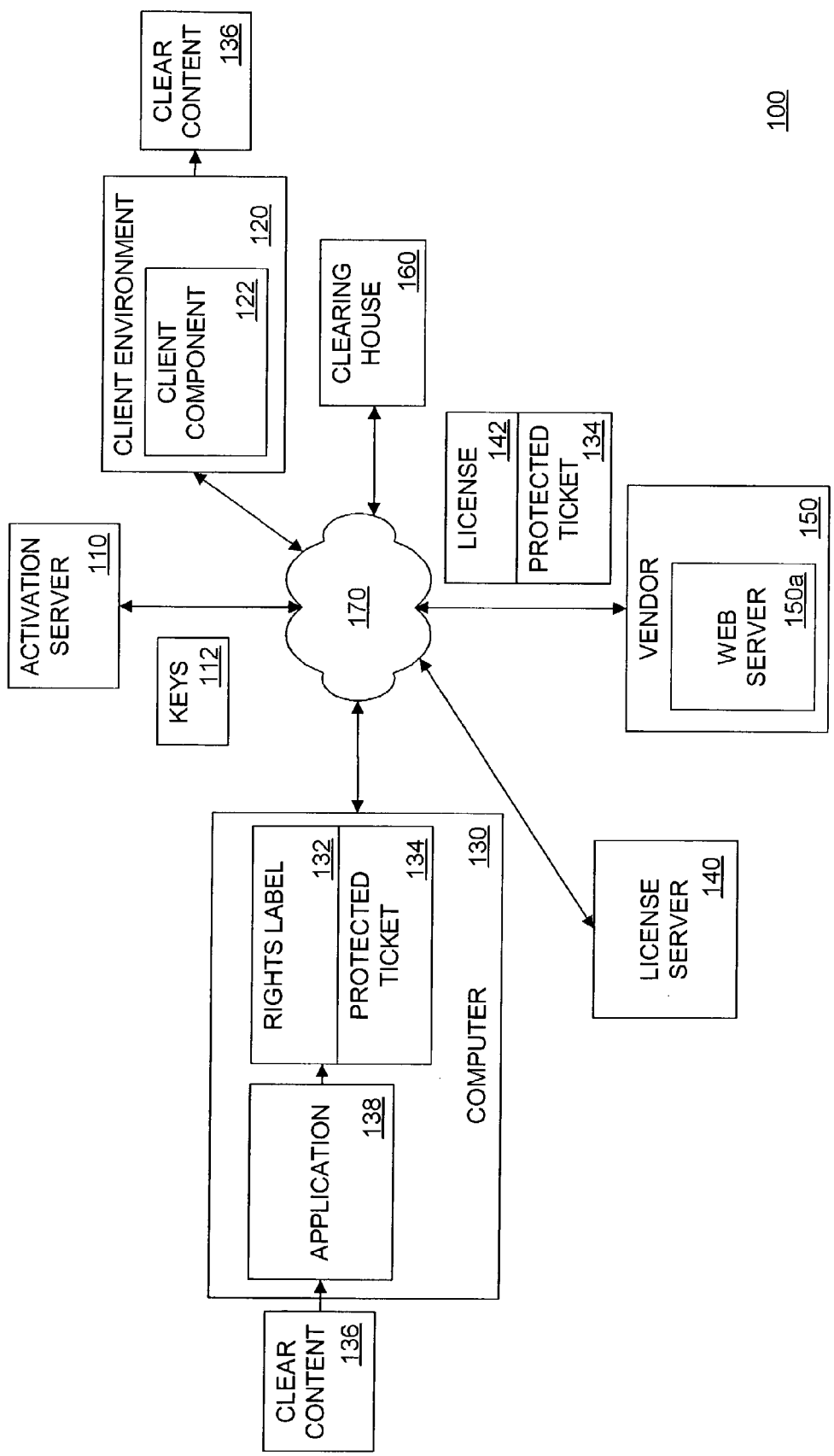
FIG. 1 illustrates an exemplary Digital Rights Management system on which various exemplary embodiments of the present invention can be implemented.

Referring now to the drawings, wherein like reference numerals designate identical or corresponding parts throughout the several views, and more particularly to FIG. 1 thereof, there is illustrated an exemplary Digital Rights Management system 100 that can be used in connection with the described exemplary embodiments to specify, supply, manage, process, and the like, rights expressions for enforcing usage rights associated with an item. In an exemplary embodiment, a usage right can include a specification of a permitted manner of use of an item, which can include anything for which use can be controlled by associated usage rights, such as digital content, software, services, goods, and resources. A resource can include a digital device or portion thereof to which access can be controlled by associated usage rights. A rights expression can include any suitable expression of a usage right, such as a rights label, a license, or fragments thereof. A rights label can include a prepackaged set of usage rights not associated with a specific item. A license can include a prepackaged set of usage rights including an item association. A rights expression language, such as eXtensible Rights Markup Language (XrML), eXtensible Access Control Markup Language (XACML), Open Digital Rights Language (ODRL), and the like, can be used to express a rights expression and can include any suitable language having predefined syntax and semantics and that can be used to express a usage right.

In FIG. 1, the exemplary Digital Rights Management system 100 can be employed to specify and enforce property rights for items, such as content, goods, services, other items, and the like. In an exemplary embodiment, an enforceable property right, for example, a right to use a specified item in accordance with usage rights associated with the item can be provided. In a further exemplary embodiment, a usage right can include a declarative specification of a manner of use of an item that is identifiable and enforceable through a software mechanism.

The exemplary Digital Rights Management system 100, for example, can include a user activation module, in the form of activation server 110 that can issue public and private key pairs 112 to users in a protected fashion. During an activation process, information can be exchanged between the activation server 110 and a client environment 120, such as a computer or other device associated with a user, wherein a client component 122 can be downloaded and installed in the client environment 120.

In an exemplary embodiment, the client component 122 can be configured to be tamper resistant and can include the set of public and private keys 112 issued by the activation server 110 as well as other components, such as an engine for parsing or rendering a protected item ticket 134. In an exemplary embodiment, the item ticket 134 can be used to specify an item and, for example, can include a mechanism by which a license can be associated with a non-digital item, for example, a tangible item, such as goods or services.

A rights label 132 can be associated with the item ticket 134 and can be used to specify usage rights and zero or more conditions, for example, that can be selected by an end-user. In an exemplary embodiment, a condition can include a specification of one or more prerequisites for exercising a manner of use of an item. A license server 140, for example, can be used to manage the encryption keys 112 and issues rights expressions in the form of licenses 142 for the exercise of a property right.

In an exemplary embodiment, the licenses 142 can embody the actual granting of usage rights to an end user based on usage rights selected from the rights label 132. For example, the rights label 132 can include usage rights for redeeming the item ticket 134 for an item on the condition of payment of a fee of five dollars and redeeming or distributing item ticket 134 upon payment of a fee of ten dollars. The client component 122 can be used to interpret and enforce the usage rights that have been specified in the license 142. In an exemplary embodiment, the devices and subsystems of the exemplary Digital Rights Management system 100 can communicate with each other over a communications network 170.

Figure 2:
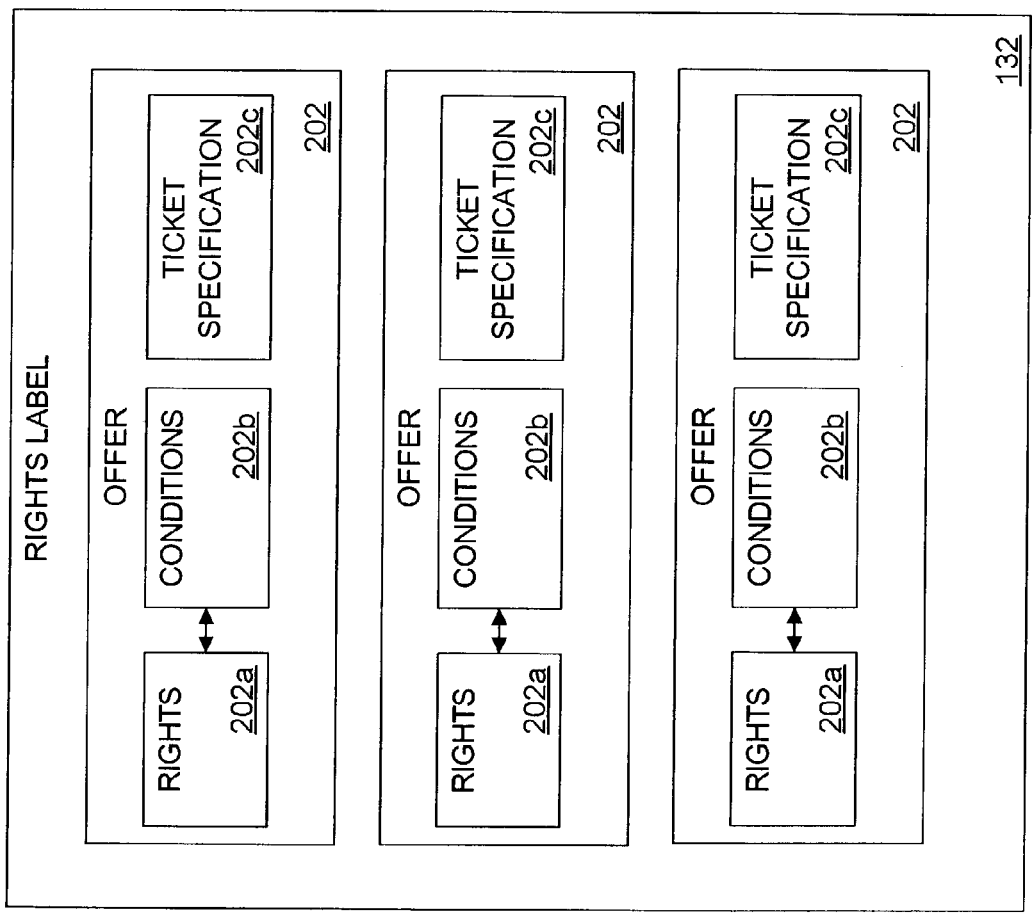
FIG. 2 illustrates an exemplary rights label that can be employed in the exemplary systems of FIGS. 1 and 5-7.

FIG. 2 illustrates an exemplary rights label that can be employed in the exemplary systems of FIGS. 1 and 5-7. In FIG. 2, the rights label 132 can include plural rights offers 202. The rights offer 202 can include usage rights 202a, conditions 202b, and ticket specification 202c. The ticket specification 202c can include any suitable mechanism for referencing, calling, locating or otherwise specifying the item ticket 134 associated with the rights offer 202. The rights label 132 can be expressed using a suitable rights expression.

FIG. 3 illustrates an exemplary license that can be employed in the exemplary systems of FIGS. 1 and 5-7. In FIG. 3, a rights expression in the form of the license 142, for example, can include a unique license identification (ID) 142a and a grant 142b, for example, including usage rights, a principal, conditions, state variables, and a ticket specification designating an associated item ticket 134. The license 142 also can include a digital signature 142c, including any suitable cryptographic keys, and the like, for unlocking item ticket 134.

In an exemplary embodiment, usage rights can be used to specify manners of use. A manner of use can include the ability to use an item in a specified way for a specified period of time, to buy an item for a specified period of time, and the like. In an exemplary embodiment, usage rights can be bundled, can be used to specify transfer rights, such as distribution rights, can be used to permit granting of usage rights to others or to permit the derivation of usage rights, and the like. Such usage rights also can be referred to as meta-rights, which can include rights that can be manipulated, modified, and the like, to derive other usage rights. Thus, the meta-rights can include usage rights to usage rights, such as rights to offer, grant, obtain, transfer, delegate, track, surrender, exchange, revoke, and the like, usage rights to/from others. The meta-rights can include the rights to modify the conditions associated with other rights. For example, a meta-right can include the right to extend or reduce the scope of a particular right. A meta-right also can include a right to extend or reduce the validation period of a right.

In an exemplary embodiment, one or more conditions to be satisfied in order to exercise the manner of use in a specified usage right can be employed. For, example, a condition can include the payment of a fee, the submission of personal data or any other suitable requirement desired before permitting exercise of a manner of use. The conditions can include access conditions. For example, access conditions can apply to a particular group of users, such as students in a university or members of a book club. In an exemplary embodiment, a condition can be that a user is a particular person or a member of a particular group. In an exemplary embodiment, rights and conditions can exist as separate entities or can be combined.

In the exemplary embodiments, some conditions need be satisfied in order to render the item ticket 134 or otherwise convert the item ticket 134 into a form that is redeemable for the item specified therein. In an exemplary embodiment, other conditions can be applied to the ticket 134 in redeemable form, and can be referred to as post license conditions.

In an exemplary embodiment, the state variables can be used to track dynamic states, conditions, and the like. For example, the state variables can include variables having values that represent the status of an item, the status of usage rights, the status of a license or other dynamic conditions. The state variables can be tracked, for example, by clearinghouse 160 or another device, based on identification mechanisms in the license 142 and the ticket 134.

In an exemplary embodiment, the value of the state variables can be used in a condition. For example, a usage right can include the right to redeem the item ticket 134 for specified goods and a condition can include that the usage right can be exercised three times. Each time the usage right is exercised, the value of the state variable can be incremented. In an exemplary embodiment, when the value of the state variable reaches three, the condition can no longer be satisfied and the ticket 134 can no longer be redeemed.

In an exemplary embodiment, a state variable can include time. For example, a condition of the license 142 can specify that the item ticket 134 be redeemed within thirty days. A state variable can be used to track the expiration of the thirty days time limit. In an exemplary embodiment, the changes in the state of a usage right can be tracked as a collection of state variables. Advantageously, the collection of such changes of the state of a usage right can be used to represent the usage history of such a usage right.

In an exemplary embodiment, the item ticket 134 can be prepared with a document preparation application 138 installed on a computer 130, for example, associated with the distributor of an item, a content service provider or any other suitable party. The preparation of the item ticket 134, for example, can include the specifying of the rights and any suitable conditions or state variables values under which the item ticket 134 can be redeemed. The rights label 132 can be associated with the item ticket 134 and the item ticket 134 can be protected with a cryptographic algorithm or any other suitable mechanism for preventing processing, rendering, and the like, of the item ticket 134.

In an exemplary embodiment, a rights language, such as XrML, XACML, ODRL, and the like, can be used to express a rights expression specifying the rights, conditions, state variables, and the like, for the rights label 132. In a further exemplary embodiment, however, the rights and conditions can be specified in any suitable manner. Accordingly, the process of specifying rights refers to any suitable process for associating rights with a ticket. The rights label 132 associated with the item ticket 134 and the encryption key used to encrypt item ticket 134 can be transmitted to license server 140 over the communications network 170.

FIG. 4 illustrates an exemplary item ticket that can be employed in the exemplary systems of FIGS. 1 and 5-7. In FIG. 4, the item ticket 134 can include an item reference 134a that can be used to specify the item, and post license conditions 134b. In an exemplary embodiment, the item ticket 134, with the security mechanism unlocked, can include a human readable or computer readable coupon, a code, a document, and the like. Accordingly, an item ticket can include any suitable tangible or intangible indication of an item. The item ticket 134 can be used to specify one or more items. Thus, advantageously, usage rights and conditions can be associated with any suitable item including, objects, classes, categories, and services, for which use, access, distribution or execution is to be controlled, restricted, recorded, metered, charged or monitored in some fashion. The item ticket 134 and the license 142 thus can be used to define a property right.

In an exemplary embodiment, the item ticket 134 can be linked to the corresponding item through the item reference 134a. Such linking can include any suitable type of association, such as a description, a pointer, and the like. For example, the ticket 134 can include a unique code associated with an item through a database record. When the code is presented to a vendor, the database can be searched and the corresponding item can be delivered. The item ticket 134 also can include a human readable description of the item or any suitable post license condition 134b not yet satisfied. For example, if a condition in the license 142 specifies that the item ticket 134 must be redeemed at a certain location or time, such a condition can be parsed and transferred to the item ticket 134 as the post license condition 134b.

An exemplary workflow for the exemplary Digital Rights Management system 100 can include a user operating within the client environment 120 being activated for receiving the item ticket 134 by the activation server 110. Then, the public-private key pair 112 and, for example, user/machine specific information, can be downloaded to the client environment 120 in the form of the client software component 122. In an exemplary embodiment, the activation process can be accomplished at any suitable time prior to the issuing of license 142.

In an exemplary embodiment, the usage rights, conditions, state variables, and the like, of the license 142 can be stored together with the item ticket 134 or can be associated with the item ticket 134. For example, the item ticket 134 can include a reference to the usage rights that can be stored elsewhere. When the user wishes to obtain a specific enforceable property right to an item, the user can make a request for the item ticket 134, which specifies the item through the item reference 134a.

In an exemplary embodiment, a user can browse a Web site running on Web server 150a of a vendor 150, using a browser installed in the client environment 120, and request an item corresponding to the item ticket 134, and as specified in the item reference 134a. The user can examine the rights offers 202 in the rights label 132 associated with the item ticket 134 and can select desired usage rights and conditions. During this process, the user can go through a series of steps, for example, to satisfy conditions of the usage rights, including a fee transaction, other transactions, such as the collection of information, and the like.

When the appropriate conditions and other prerequisites, such as the collection of a fee and verification that the user has been activated, are satisfied, the Web server 150a can be used to contact the license server 140, for example, over the communications network 170, including a secure communications channel, such as a channel using a Secure Sockets Layer (SSL), and the like. The license server 140 then can generate the license 142 for the item ticket 134 and the Web server 150a can be used to download the item ticket 134 and the license 142.

In an exemplary embodiment, the license 142 can include the usage rights 202a and the conditions 202b selected from the rights label 132 of the item ticket 134 and can be downloaded from a computer associated with a vendor, distributor or other party. In an exemplary embodiment, the item ticket 134 can be secured, for example, through encryption or other security mechanisms and can be rendered, accessed, and the like, through a rights expression in the form of the license 142, which can include a mechanism for unlocking the item ticket 134. In an exemplary embodiment, any suitable mechanisms for controlling access to documents can be employed.

The client component 122 in the client environment 120 can then interpret the license 142 and allow rendering or other access of the item ticket 134 based on the rights and conditions specified in the license 142. In an exemplary embodiment, any suitable mechanisms for the interpretation and enforcement of usage rights and related systems and techniques can be employed. The above processing can take place sequentially, approximately simultaneously or in various sequential orders. For example, if the license 142 is configured for the purchase of an item at a price of ten dollars within one month of the issue date of the item ticket 134, the client component 122 can render the item ticket 134 as a displayable or printable coupon for such a purchase expiring in one month, wherein the price and expiration data can be the post license conditions 134b. In an exemplary embodiment, such conditions can be set forth on the rendered or otherwise unlocked form of the item ticket 134 and can be discerned upon redemption of the item ticket 134.

Advantageously, the exemplary Digital Rights Management system 100 addresses security aspects of the item tickets 134. For example, the exemplary system 100 can be used to authenticate the license 142 that has been issued by the license server 140. In an exemplary embodiment, such authentication can include the application 122 configured to determine if the license 142 can be trusted. For example, the application 122 can be configured to include the capability to verify and validate the signature 142c, such as a cryptographic signature or other identifying characteristic of the license 142, using any suitable mechanisms, algorithms or techniques. In a further exemplary embodiment, the license 142 and the item ticket 134 can be distributed from different entities.

In an exemplary embodiment, the clearinghouse 160 can be used to process payment transactions, verify payment prior to issuing a license, and the like. In further exemplary embodiments, however, various other workflows can be employed, various other parties can be involved, and various other devices and architectures can be used to accomplish the workflows.

In an exemplary embodiment, a distributor or other party can associate the rights label 132 with the item ticket 134. The rights label 132 can be registered with clearinghouse 160 and stored in a repository, such as a memory device associated with clearinghouse 160. The item ticket 134 can be stored in a ticket repository, such as a storage device associated with the distributor. In a further exemplary embodiment, the rights label 132 and the item ticket 134 can be stored on the same device or in a common file.

In an exemplary embodiment, the private key 112 or other identification information can be issued to the user upon purchase of the license 142. Payment for the item can be passed from the user to the license server 140 or other party by way of the clearinghouse 160, which can collect requests from the user and from other users wishing to purchase a property right in items. The clearinghouse 160 also can collect payment information, such as debit transaction information, credit card transaction information, information regarding other electronic payment schemes, and the like, and forward the collected payments as a payment batch to the ultimate provider of the item.

In an exemplary embodiment, the clearinghouse 160 can retain a share of the payment and the distributor can retain a portion of the batch payment from the item provider and forward a payment to the item provider. The clearinghouse 160 can be used to determine the payment made to parties in the revenue stream of the item. The clearinghouse 160 can serve as a transaction aggregator, which can function to aggregate plural transactions over a period of time, and charge parties in an appropriate manner, advantageously, reducing accounting overhead.

In an exemplary embodiment, a user can request the item ticket 134 corresponding to a desired item through the Web server 150a and provide information, such as credit card and charge authorization information, personal information, and the like, to permit the clearinghouse 160 to satisfy conditions specified in the license 142 associated with the item ticket 134. Authorization identification information, such as a private key, obtained from the activation server 110 also can be submitted. Advantageously, the license 142 can permit the item ticket 134 to be decrypted or otherwise can allow the security mechanism thereof to be unlocked so that the item ticket 134 can be used in accordance with the usage rights specified in license 142.

In an exemplary embodiment, the item ticket 134 can be used to specify any suitable item and, when combined with the usage rights 202a selected from the rights label 132 and embodied in the license 142, can represent an enforceable property right that can be exercised by redeeming the item ticket 134. The redemption of the item ticket 134 can include presenting a rendered coupon or code to a vendor electronically or physically. In further exemplary embodiments, however, the redemption of the item ticket 134 can take on various other forms and can include various other processes. Accordingly, redeeming can include any suitable process or mechanism for converting the item ticket 134 to access an item.

In an exemplary embodiment, clear content 136, such as unprotected content, can be prepared with the application 138, such as a document preparation application, installed on the computer 130 associated with a content publisher, a content distributor, a content service provider or any other suitable party. Preparation of the clear content 136 can include specifying the usage rights 202a and the conditions 202b under which the clear content 136 can be used, associating the rights offer 202 with the clear content 136, and protecting the clear content 136 with, for example, a cryptography algorithm to generate protected content.

In an exemplary embodiment, a rights language, such as XrML, XACML, ODRL, and the like, can be used to specify the rights offer 202. However, the rights offer 202 can be specified in any suitable manner. The specifying of rights information can include creating, deriving or otherwise utilizing information that relates to rights expressions. In an exemplary embodiment, the rights offer 202 can be in the form of a pre-defined specification, profile, template, and the like, that can be associated with the protected content. Accordingly, the process of specifying the rights offer 202 can include any suitable process for associating rights, conditions, and the like, with content. The rights offer 202 associated with the protected content and the encryption key 112 used to encrypt the clear content 136 can be transmitted to the license server 140 and can eventually be used by the client environment 120.

In an exemplary embodiment, an enforceable property can be illustrated with respect to a stock or other market exchange. For example, a property right can include the right to buy or sell a security in advance or at a threshold. In an exemplary embodiment, the item ticket 134 can be used specify 1000 shares of stock of a specific company in the item reference 134*a*. The right to buy the stock between two thresholds, at a specified future time, and the like, can be specified by usage rights and conditions. The item ticket 134 also can be used to specify a margin call, the ability to change the type of stock, such common or preferred, the ability to convert stock options to regular stock, and the like. In an exemplary embodiment, usage rights can be associated with stock during bankruptcy proceedings, for example, for determining who can liquidate first and in what manner. The condition of during bankruptcy and the status of other parties, such as creditors, for example, can be expressed as the state variables.

In an exemplary embodiment, an enforceable property can be illustrated with respect to real estate. For example, a property right to real property can be expressed to include joint-tenant or tenant-in-common relationships, with an option to convert to other options, with a change of percentage of ownerships, with designation of a survivorship option, and the like. Advantageously, such ownership rights can be expressed as usage rights and the real property can be specified in the item reference 134*a* of the item ticket 134.

In an exemplary embodiment, the item reference 134*a* of the item ticket 134 can be used to specify professional services. For example, a user can buy the right to visit an office of a specified dentist, the office of one or more associated dentists, for a period of 1 year, while paying only a fixed or variable co-payment for each visit, up to a maximum amount. In an exemplary embodiment, the item ticket 134 can be used to specify a lawyer, an accountant, and the like, and usage rights and conditions can be used to specify a period of time, a fixed number of times, a specific project or issue to which use of the item is limited. In an exemplary embodiment, the item reference 134*a* can be used to specify in advance the right for services offered by an organization, including the rights associated with intellectual property, such as patents, copyright, trademarks, and the like. Advantageously, the exemplary embodiments can be applied to software programmers, customer service representative, training services or other technical or non-technical services.

The exemplary embodiments can be employed to allow a user to obtain a property right and later sell the property right to a third-party, for example, if such transfers are authorized by usage rights of the license 142 associated with the item ticket 134. Advantageously, the exemplary embodiments are applicable to mobility and liquidity for different types of assets, enabling the expansion of market concepts to include property rights to any suitable item. For example, a property right can include the item ticket 134 defining a coupon, a gift-certificate, a rain-check, an exchange certificate, a return, an authorization, and the like, where rights and conditions of the license 142 can be associated with the redemption thereof. In an exemplary embodiment, a coupon can be configured so as to be rendered only after the conditions are satisfied. In a further exemplary embodiment, post license conditions 134*b* can be expressed in the rendered coupon.

The exemplary embodiments are applicable to any suitable type of financial account or transaction, such as certificates of deposit, checking accounts, wire transfers, e-mails, fund transfers, currency exchanges, locks on current or future interest rates, points or other fees paid for a loan, bonds, loans, secondary loans, and stocks, for example, which can have one or more attributes, such as maturity dates or deadlines. The item reference 134*a* can be used to specify such items and the license 142 can be used to specify rights and conditions associated with the access to such items.

The exemplary embodiments are applicable to the right for future tangible or intangible things or objects, such as books in printed or in electronic form, music, on physical media or in electronic form, and the like. The usage rights and conditions of the license 142 can be used to limit a specified right to during or after a period of time or to a predetermined number of units, such as units of CDs or books.

In an exemplary embodiment, a property right can include rights expressed for a will or a trust for the distribution of property or other assets, for the provision of rights, services or benefits for persons or entities and other things and that can be specified by the item reference 134*a*. Advantageously, access can be restricted to certain parties or in any other suitable way by usage rights and conditions.

In an exemplary embodiment, a property right can include online services. For example, diet and vitamin calculations customized based on characteristics and data of an individual, stock quotations, interest rate and mortgage payment calculations, credit ratings, background checks, loan application and approval, online banking, investment advice, translation services, graphic design, advertisement services, currency conversion and exchange, job placement, and the like, can be specified by the item reference 134*a* of the item ticket 134. In an exemplary embodiment, the item ticket 134 can include an access code to the online service that can be used after conditions of the license 142 have been satisfied.

In an exemplary embodiment, a provider of items or another specified party can specify the conditions for access to the corresponding items. For example, a user wishing to obtain a property right in such an item would have to satisfy such conditions. In an exemplary embodiment, such a concept can be employed regardless of the direction or order in which information travels. For example, a user can supply conditions to a supplier in the license 142, and which the supplier would have to satisfy in order to make a sale.

In an exemplary embodiment, a partial satisfaction of conditions can result in a property right or other result, which can be the same or different when compared to full satisfaction of the conditions. For example, a University can collect research materials for disposition, such as for archiving for prosperity or for making the research materials available to students, wherein the University can be the recipient of the information. The University can create a server site and persons can upload material thereto. The University, however, may want to accept the information only under certain conditions. For example, the University may decide that only recognized expert invitees can be allowed to provide information, such that providers must expressly agree that the University becomes the owner of the information, and that the providers can upload to the server during off peak hours. The University, as the recipient, can have the right to specify any suitable terms for receiving such information.

If a provider of such information does not agree with the requirement of University that the University is to have ownership of such information, then the University might still accept the work, but may alter treatment of such information. For example, instead of the information being made available to all students, access to such information can be restricted to a few people. In an exemplary embodiment, the provider of such information can provide such information subject to conditions that can be specified in the item ticket 134, and the recipient can provide conditions for accepting such information. Accordingly, there can be plural rights expressions having usage rights and conditions associated with an item, with some of the rights and conditions being able to be satisfied, while others may not, and which can still result in an agreement on the basis of the rights conditions that do match up, such as access to a work, agreement on a purchase and sale, and the like.

In an exemplary embodiment, the rights and conditions required by a first party and not prohibited by the second party, plus the rights and conditions required by the second party and not prohibited by the first party, can be combined to form the rights and conditions of an agreement, such as the terms on which access to a digital work is granted. In a further exemplary embodiment, however, a party can specify a condition that the party agrees to no deal unless it is solely on the proffered rights and conditions of such a party. Thus, in an exemplary embodiment, the rights and conditions of another party can include prohibited rights and conditions.

In an exemplary embodiment, in addition to content owners, consumers, and the like, a party can include any suitable stakeholder, such as a parent or a government. One or more of the parties also can specify usage rights or conditions within ranges, so that if the range can be matched there can still be agreement on the basis of a match appearing within the range. For example, a dealer can specify that the dealer will accept an offer from a customer at a price within the range of $5 and up. In an exemplary embodiment, the dealer can employ techniques to keep the range hidden from the customer.

Enlightened self-interest can well dictate to a person, for example, a distributor of digital music, movies, and the like, that flexibility can be the best policy. For example, a distributor can offer music for sale on liberal terms to make high volume sales and can offer the music with rights the distributor believes consumers will find attractive. If consumers in general or some subset of the consumers find such terms unattractive, the distributor can decide to allow such terms to be modified to suit the consumer, an can well invite such modifications. For example, the distributor can offer a package of ten songs for one dollar and believe that such an offer is an attractive proposition for customers. However, if a customer wishes to purchase just one of the songs and is willing to pay fifty cents, the distributor may find such terms perfectly acceptable. In an exemplary embodiment, the distributor can specify that customers can propose modifications to the proffered rights and conditions, propose new rights and conditions or select among alternatives. If the rights and conditions requested by the consumer are within parameters, such as a range, agreeable to the distributor, a deal can be formed. In an exemplary embodiment, advantageously, the distributor can change parameters dynamically to better match rights and conditions that are requested.

The exemplary embodiments are applicable to a customer that is receptive to receiving promotional materials on subjects of interest to the customer. For example, the customer may wish to receive travel brochures, and the like. However, the customer may wish to control what information the customer receives, and when and how the customer receives such information. Such a business application is different from the distributor scenario, where the distributor may have valuable content, such as a popular song, movie, and the like, for which there is a demand. By contrast, the provider of the promotional materials may have to convince people to accept such material. Accordingly, the tables are turned on bargaining power and the proposed recipient might often call the shots on rights and conditions. For example, the provider may decide to grant all desired rights in the content, impose a few conditions or none at all, and meet all terms demanded by the customers.

The exemplary embodiments can employ a digital ticket, for example, as further described in U.S. Pat. No. 6,336,971. In an exemplary embodiment, a digital ticket can include a digital token, and the like, possession of which can be a condition for exercising a manner of use specified in a usage right. For example, with respect to the exemplary embodiments relating to the University, an invitee can deposit information with the University, if the invitee presents an appropriate digital ticket. In a further exemplary embodiment, a person can vote, if the person present a digital ticket recognized by the elections board. The digital ticket can be punched to ensure no double voting with the same ticket. In a further exemplary embodiment, a sender can send an e-mail that does not meet standards for acceptance of a recipient, for example, the e-mail is over a one kilobyte limit, if the sender presents a digital ticket. In an exemplary embodiment, the presence, possession, presentment, and the like, of a digital ticket can be a condition to the exercise of a right expressed by the usage rights.

In an exemplary embodiment, Digital Rights Management systems, where access to digital resources can be controlled by a rights expression, can be employed. Typically, in such systems, rights expressions specifying usage rights can be created and associated with an item at one repository and another repository can then request access to the item in a client-server relationship. In an exemplary embodiment, a client-server relationship is provided, wherein client and server repositories can create a rights expression specifying the rights label 132 and the usage rights 202a and can associate the rights expression with an item. Once the rights label 132 and the item ticket 134 have been created, the client environments 120 can be configured to push items, such as digital content, up to servers for distribution or other purposes, as prescribed in the associated rights.

Figure 5:
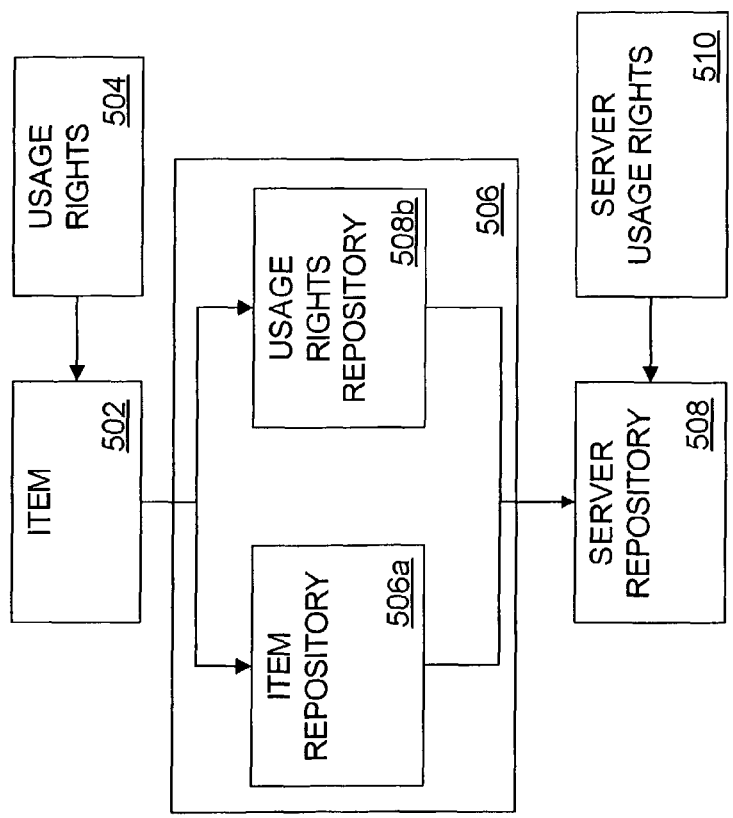
FIG. 5 illustrates an exemplary Digital Rights Management system in which a client and server repository can create and associate usage rights.

FIG. 5 illustrates an exemplary Digital Rights Management system 500 in which a client and server repository can create and associate usage rights. In FIG. 5, a digital work or other item 502, for example, in the form of digital content, such as a movie, song, and the like, can be employed, but the exemplary embodiments can be applied to any suitable type of item. A creator can create the item 502 and specify, via a rights expression, usage rights 504 for association with the item 502. In an exemplary embodiment, the usage rights 504 and the associated item 502 can be deposited in respective client repositories 506b and 506a. In a further exemplary embodiment, the usage rights 504 and the associated item 502 can be deposited in a same client repository 506, such as a common repository.

In an exemplary embodiment, the repositories 506b and 506a can be the same or different physical devices. The repository 506 can initiate a session with a server repository 508. The repository 506 or repository 506a if the usage rights 504 and the item 502 are not in a common repository can upload the item 502 along with the associated usage rights 504 to the server repository 508. In an exemplary embodiment, the item 502 can be uploaded or otherwise transmitted before, after or at the same time as the usage rights 504. For example, the item 502 can be uploaded after it is determined that the server repository 508 accepts access thereto. The server repository 508 can check to see if the usage rights 504 specify that the server repository 508 can access the item 502. If the usage rights 504 do not permit the server repository 508 to access the item 502, the server repository 508 can refuse access or terminate the session. If, however, the server repository 508 can have access to the item 502, the server repository 508 can perform authorized actions requested by the client repository 506 in accordance with server usage rights 510.

In an exemplary embodiment, if the usage rights 504 do not permit the server repository 508 to access the item 502, the server repository 508 can initiate a session with the repository 506 requesting access and specifying the server usage rights 510 that the server repository 506 requests. In a further exemplary embodiment, the repository 506 can initiate such a session. If the client repository 506 agrees to such access, then access can be granted.

In a exemplary embodiment, the determination as to whether there is agreement on access can be on the basis of the rights and conditions specified by the server repository 508 and not prohibited by the repository 506, plus the rights and conditions specified by the repository 506 and not prohibited by the server repository 508, combined to form the rights and conditions of an agreement. In further exemplary embodiments, however, other rules can be employed. One or more of the client repository 506 and the server repository 508 can perform the function of determining if there is a agreement or both repositories can do so and compare results. In an exemplary embodiment, the client 506 or server 508 repository can initiate a request and, thus, be a requesting repository. In an exemplary embodiment, a particular usage right, request or repository need not specify the rights and conditions.

In an exemplary embodiment, after performing the requested action, the server repository 508 can provide feedback to the repository 506 based on the execution of the requested action. In an exemplary embodiment, such feedback can include the result of a requested action or an acknowledgement of receipt of the request.

In an exemplary embodiment, the rights and conditions for comparison can be generated in any suitable manner. For example, the usage rights associated with digital works or other items and one or more repositories can be employed. In a further exemplary embodiment, however, usage rights need not be employed. In an exemplary embodiment, usage rights associated with an item can be compared with rights and conditions specified in a request from a requesting repository.

In an exemplary embodiment, a client repository, in a client-server model, can be configured to create and associate usage rights to the items, such as digital works. By contrast, typical client side repositories simply consume content distributed by a server repository and typically are not involved in the creating of usage rights. In an exemplary embodiment, a provider of items or another specified party can specify the conditions for access to the items and a user wishing to obtain a property right in such items has to satisfy such conditions. The exemplary embodiments work equally well, regardless of the direction or order in which information moves. For example, a user can supply conditions to the supplier and the supplier has to satisfy such conditions to make a sale. The exemplary embodiments, thus, provide the ability to create rights associated with a client repository.

The exemplary embodiments are applicable in a scenario where ten law firms team up as a consortium to bring a suit and split profits, such as fee awards, and the like. For example, the law firms may desire that the law firms provide documentary evidence and other information and share the cost of maintaining such information. The law firms may want to maintain the information in a central repository, such as the central repository 706. Such a consortium, thus, needs to get information in and out of the central repository. The consortium may want to ensure that the information deposited or put into the repository meets certain conditions, such as being deposited by an authorized person, being in an agreed upon format, such as an Adobe PDF format, being tagged with authorized meta data for searching, being of not too many bytes, being scanned for viruses by appropriate software, such as Symantec virus software, and the like. The law firm consortium also can require that the depositor pay $1 towards expenses for each document deposited.

In an exemplary embodiment, the law firm consortium can have a list or class, which includes depositors that pay $1 per deposit or per period of time, called Class A. There also can be a second class, called Class B, in which the depositors pay $2.50 per deposit, and more classes C, . . . , N, which have variable or graduated payment schemes. Further, there can be a class M1, which signifies the depositors who must pay $1 per deposit, and a class M2, which signifies the depositors who must pay $2.50. Thus, depending on the usefulness of the class to the overall consortium or based on the overall ratings or predetermined rules or contracts, the consortium can set the payments or conditions in both directions for the different classes.

In an exemplary embodiment, the directions or conditions can be changed based on the dynamic conditions, such as based on the interest rate, for example, as further described in commonly assigned, co-pending, U.S. patent application Ser. No. 09/867,745 of Tadayon et al., entitled "METHOD AND APPARATUS FOR DYNAMICALLY ASSIGNING USAGE RIGHTS TO DIGITAL WORKS," filed May 31, 2001, the entire disclosure of which is hereby incorporated by reference herein. Advantageously, the exemplary embodiments can be used to implement the above-noted invention.

In the exemplary embodiments related to the law firm, the usage rights can be assigned to a central repository to tell the central repository what to do when presented with an item for deposit. In a further exemplary embodiment, in combination with the dynamic rights and dynamic conditions, the user can influence the outcome based on preferences of the user, for example, via a user interface, to change the relative weight of the dynamic conditions as time passes.

In an exemplary embodiment, a law firm wishing to deposit information can prepare the item to be deposited, including content, such as the transcript of a deposition, a rights label 132, and a protected item ticket 134. The license server 140 can check to determine that the conditions established by the consortium for deposit have been fulfilled and, if so, can permit deposit of the information into the central repository. The $1 deposit fee, for example, can be collected by way of the clearinghouse 160, can be deducted from a deposit account or can be accounted for by some other means.

In an exemplary embodiment, if the corresponding conditions for deposit are not met, authorization to deposit can be denied. In a further exemplary embodiment, however, if the conditions are not met, authorization to deposit can be denied, but the corresponding item can be deposited in a temporary storage, which can be kept for a fixed or indefinite period of time during which if the conditions are met, then the item can be transferred to a main or central repository for deposit.

In an exemplary embodiment, information can move from many sources to a central source, such as the case where the University collects research materials. Any suitable right and condition that a provider can specify as the terms under which the provider will give the University information can equally be specified by the University as the rights and conditions applicable to an agreement to receive the information. This concept can be referred to as specifying the conditions of the ability to provide or can be thought of as a right to be free from having something supplied unless it is supplied on the terms agreed for receipt. Thus, the law firm consortium and the University have established the rules on which they agree to receive information, and which can be implemented with the exemplary Digital Rights Management systems of FIGS. 1, and 5-7 configured to enforce such rules.

The exemplary embodiments, thus, are applicable to the supplying of digital content to law firms, Universities, and the like, but also can be applied to the supplying of any suitable items to any other suitable entity. In an exemplary embodiment, the thing being supplied can include the item tickets 134. In a further exemplary embodiment, the supplier can be configured to meet the rules established by the recipient, such as a customer, and which can be implemented via the exemplary system Digital Rights Management system of FIGS. 1, and 5-7.

Advantageously, the exemplary embodiments can be useful for scientific paper deposits for journal or conference presentations. For example, a journal or conference can have one or more editors and/or associate editors. Accordingly, there may be multiple steps of review and a hierarchy of authorities for review and editing between editors and reviewers, and which, advantageously, can be specified with an appropriate rights expression. The depositor can specify, via a suitable rights expression, usage rights, conditions, privileges, assignment rights, voting, vetoing power, editing power, security level, ability for viewing internal comments or hiding comments, integrating comments, using different size keys for encryption, revoking powers, control on direction of flow of information, and the like. The exemplary embodiments, thus, also can be applied to newspaper editors and journalists that work occasionally or on a full-time basis for a newspaper, and which have different levels of security, access, modification or editing privileges.

The exemplary embodiments are applicable to receipt of e-mail. For example, a recipient of e-mail can specify in a suitable rights expression that e-mail will not be received unless the e-mail meets certain conditions. In an exemplary embodiment, the recipient can specify that e-mail cannot be more than 200 characters in length or one kilobyte in size or cannot have an attachment or cannot be from a sender in the @name.net domain. In an exemplary embodiment, a rights expression can be used to specify that e-mail cannot be an item failing to meet the above criteria, unless the sender has permission to deviate from the noted rules. In an exemplary embodiment, the recipient can specify that certain parameters must be present, such as that the e-mail must be less than one kilobyte, but that the other restrictions can avoided by a person who has been given such permission.

In an exemplary embodiment, voting over the Internet can be enabled via corresponding rights expressions. For example, a state can elect to employ the technology of Internet voting in lieu of voting in person on election day or sending in a paper absentee ballot. There is a need to ensure that only registered voters vote and that they cast votes in the proper voting district, which can be specified in a corresponding rights expression. The voters can access the election board site to vote only with permission and only to vote in the elections to which they are entitled to vote, which can be specified in the corresponding rights expression. The right of a voter to provide a vote to the elections board can be subject to the fulfilling of conditions established by the elections board, as specified in the corresponding rights expression.

In a further exemplary embodiment, rights expressions can be used to specify that a voter can personally be present at any of a number of suitable designated places, and once there, present a displayable or printable coupon on which information necessary to ensure the voter is entitled to vote in that particular election, and that the coupon can be used only once. In an exemplary embodiment, such a coupon can be presented at an un-manned kiosk and there can be employed security measures, such as a personal identification numbers (PINs), biometrics, and the like, to ensure the presenter is the voter entitled to cast a vote. In a further exemplary embodiment, such a coupon can be of an electronic form and reside on a transportable device, and the like.

In an exemplary embodiment, if the voter is not authorized, the kiosk can behave as if everything is okay, and meanwhile, discard the vote and notify authorities of the discrepancy or of hacking attempts, physical damage, forced entry, and the like, using the biometrics as a way of identifying the unauthorized party. The exemplary embodiments, however, can be applied to any suitable kind of a situation where there is an unauthorized attempt and can be employed as a security measure.

In an exemplary embodiment, the server repository 508 and the client repository 506 can create and associate usage rights with the items 502, such as digital works or other items. Thus, the exemplary system 500 can be used to implement a partial satisfaction of conditions that can result in a property right or other result, which can be the same or different when compared to full satisfaction of the conditions. For example, when the server repository 508 checks to see if the server repository 508 has the rights to access the item 502, such checking can be done against the server usage rights 510 associated with the server repository 508. The server usage rights 510 can be used to specify the conditions under which the server repository 508 agrees to accept the item 502 from the client repository 506. Thus, the server repository 508 can be given access to the item 502, if the usage rights 504 provided by the client repository 506 authorize access and the usage rights 510 associated with the server repository 508 also permit the server repository 508 to have access to the item 502.

In an exemplary embodiment, such conditions can be dynamic conditions and the state variables can be used track such potentially dynamic state conditions. The state variables can include variables having values that represent the status of an item, usage rights, license or other dynamic conditions. In an exemplary embodiment, the values of the state variables can be used in a condition.

Although the exemplary system 500 of FIG. 5 is described in terms of the client device repository 506 and the server device repository 508, in a further exemplary embodiment, the roles of the repositories can be reversed and either repository can operate in both a client and/or server mode. Thus, the storage of usage rights or items or digital works, the session initiation, the uploading and checking of the usage rights and the other functions, for example, can be performed by any suitable repository including another or any suitable number of other repositories.

In an exemplary embodiment, a user working with a personal computer (PC), such as the client repository 506, can create an item 502, such as word processing document. The user may want to convert the word processing document 502 into a document in another format, such as the Adobe PDF format, but the PC of the user may lack the software to perform such a conversion. In an exemplary embodiment, a publicly available server repository 508, however, can be configured to provide a service for converting from a word processing format to another format. Such a service can be performed on the condition that the user pays a fee of $1, for example, as specified in the server usage rights 510.

The user at the client repository 506 then can create and associates with the word processing document 502 the usage rights 504 permitting only the designated server repository 508 to access the word processing document 502 and for the purpose of converting the word processing document 502 to the other format. The server repository 508 then can access the word processing document 502 and the associated usage rights 504. The server repository 508 then can check to see if the server repository 508 has the necessary rights to access the word processing document 502.

After determining from the usage rights 504 that the server repository 508 does have such a right, the server repository 508 can proceed to convert the word processing document 502 into a document in the other format. The server repository 508 then can associate the usage rights 510 with the converted document, which allows the user full access to the converted document on the condition that the user pays the $1 fee.

In a further exemplary embodiment, prior to conversion of the word processing document 502 into the other format, the server repository 508 can require payment of the $1. Such a requirement can be associated with the server repository 508 via the usage rights 510 and the server repository 508 can check the conditions under which the server repository 508 is permitted to accept the word processing document 502 from the client repository 506 for the purpose of performing the conversion. The server repository 508 then can determine that the payment of $1 is required and the server repository 508 can perform the conversion to the other format if the $1 is paid.

In an exemplary embodiment, multiple repositories each can be used to assign usage rights to a particular item or just one repository can assign usage rights to an item on multiple occasions. The assigning repositories can be controlled by one or more entities or stakeholders. The usage rights can be cumulative. For example, in the case of a digital work in the form of a movie file, music file, and the like, initially a studio can create a usage right, for example, that permits viewing of the movie file five times within a thirty day period. A customer then can obtain the movie file with the associated usage right. Twenty-nine days later, the studio can decide to offer the customer a new deal and permit the customer unlimited viewing of the movie file for one year.

Accordingly, a transaction using any suitable methods, such as a transaction through an Internet site, and the like, can be performed between the studio and the customer and the movie possessed by the customer can have two usage rights associated therewith and the customer can exercise either one of the usage rights. In an exemplary embodiment, the first usage right can effectively be a subset of the second usage right, so effectively the second usage right can define the rights that the customer has with respect to the movie file.

In further exemplary embodiments, however, plural usage rights need not be subsets of each other. For example, the first usage right the customer obtained can be for five views within an unlimited period of time. If in the first twenty-nine days the customer uses two of those five views, the customer can then start using the right for the unlimited views for the next year, and, when that right has lapsed, the customer can still have three views left on the first usage right.

In an exemplary embodiment, the studio can specify that as a condition of the customer receiving the second usage right, the customer must give up the first usage right. In a further exemplary embodiment, the first usage right or an intervening usage right can be used to specify that no other usage rights can be associated with an item or that no more usage rights can be so assigned unless certain conditions are met.

Figure 6:
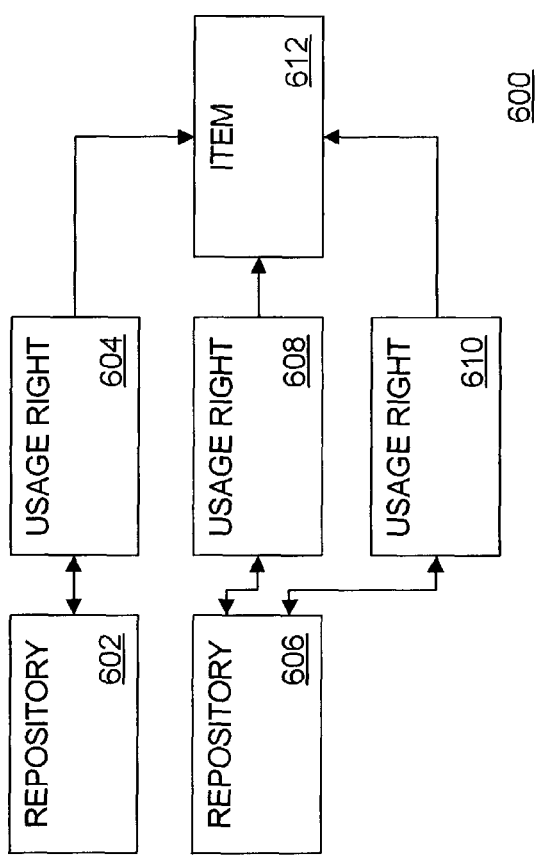
FIG. 6 illustrates an exemplary Digital Rights Management system in which plural repositories associate plural usage rights with an item.

FIG. 6 illustrates an exemplary Digital Rights Management system 600 in which plural repositories associate plural usage rights with an item. In FIG. 6, a repository 602 creates usage right 604 and associates the usage right 604 with an item 602, such a digital work or other item. A repository 606 then can create two usage rights 608 and 610 and associate the usage rights 608 and 610 with the item 612. The usage right 608 and the usage right 610 can be generated at the same time or at different times. In an exemplary embodiment, one of the usage rights 608 or 610 can be a subset of the other the usage rights 608 or 610 or the usage rights 608 and 610 can each include usage right information that is different from the other or from the usage right 604.

In an exemplary embodiment relating to the access of the item 612 in the form of a movie file, music file, and the like, the repository 606 can be controlled by the movie studio and the usage right 608 can permit the movie file 612, to be viewed five times within thirty days. The usage right 610 can be subsequently issued by the studio permitting unlimited viewing for a year. In an exemplary embodiment, the studio can create a business arrangement with a distributor giving the distributor, for example, via the exemplary meta-rights, the right to distribute the movies of the studio, including the right to provide usage rights to possessors of the movie file 612. In an exemplary embodiment, the distributor can maintain control of the repository 602.

After more than a year after the customer obtained the usage right 604 and the customer has consumed all rights under usage right 608, the customer learns that the distributor is offering to provide usage rights permitting the movie file 612 to be viewed an unlimited number of times on the condition of payment of $2. The customer then can initiate a transaction with the repository 602, pay the $2 fee and obtain the usage rights 604, which are associated with the movie file 612. Thus, the movie file 612 can have the usage rights 604, 608, and 610 associated therewith, wherein rights given by two of the usage rights have expired. In a further exemplary embodiment, however, zero or more of the usage rights 604, 608, and 610 can be active at the same time.

In an exemplary embodiment, a user, such as a customer, can be permitted to exercise whichever of plural usage rights the user possesses and that the user chooses to exercise. Advantageously, such a liberal approach can be particularly suited for business to consumer situations. For example, a consumer having two item tickets permitting rental of a car at two prices can choose the lowest price or the least restrictive item ticket. In an exemplary embodiment, a customer who possesses a copy of a song file, a movie file, and the like, can choose the right to play the file for free instead of the right to play the file for a fee. In an exemplary embodiment, any suitable systems and methods can be employed to automatically select the best usage right or the user can manually, for example, through human intervention, and the like, select the desired right or the user can specify rules or preferences to enable the system to automatically make decisions for the rights selection based on such rules or preferences.

In a further exemplary embodiment, a restrictive system can be provided that can typically be employed in business, government or other enterprise environments. In an exemplary embodiment, use of the system can be permitted based on the most restrictive usage right.

In a further exemplary embodiment, a permutation of the liberal and the restrictive systems can include a system where access can be based on the most restrictive right, unless certain conditions are met. In a further exemplary embodiment, a system can be provided where access is based on the most liberal right, unless certain conditions are not met. In an exemplary embodiment, such a condition can include the presentment or presence or the lack thereof of a digital ticket. In an exemplary embodiment, such conditions can be dynamic conditions tracked by state variables, and the like.

In an exemplary embodiment, the restrictive system can include a system where plural usage rights are subsets of each other and only the lowest set usage right can be exercised. The system enforcing rights management can make the choices about which usage right applies, thus, reversing the situation where the customer decides. In an exemplary embodiment, such a choice can involve human intervention, rules or a combination thereof, wherein usage rights associated with a repository according to the exemplary embodiments can be employed. In an exemplary embodiment, where there are plural usage rights and/or conditions and some are in conflict with others, then the result can be an agreement, such as access to a work or agreement on a purchase and sale, on the basis of the rights that match up.

In the exemplary embodiments, usage rights can be associated with a repository. For example, the usage rights 504 can be assigned to the item 502, such as a digital work or other item, and the server usage rights 510 can be assigned to the server repository 508. In an exemplary embodiment, the usage rights 510 associated with the repository 508 can then be bound to or associated with the item 502. However, such association with the item 502 can be optional.

In an exemplary embodiment, the repository 508 can have one or more usage rights 510 associated therewith. Advantageously, the usage rights 510 can be used inform the repository of what usage rights, for example, including rights and/or conditions, can be associated with the item 502 and such usage rights need not be the same as the usage rights 510 associated with the repository 508.

In an exemplary embodiment, the server repository 508 can assign or pass along the server usage rights 510 to particular items 502, such as digital works or other items. In an exemplary embodiment, the server repository 508 functions can include functions for associating usage rights with the item 502. Thus, once associated, the item 502 can have one or more usage rights associated therewith, such as the usage rights assigned by the repository 508 and the usage rights, if any, such as the usage rights 504 associated with the item 502 prior to the encounter of the item 502 with the repository. Such an assignment of the usage rights can be done by any suitable method. In an exemplary embodiment, the usage rights associated with a repository then can be bound to an item, just as with usage rights previously associated with such an item.

Advantageously, the server usage rights 510 associated with the repository 508 can be used to enable the server repository 508 to know what to do when the server repository 508 encounters the item 502. In an exemplary embodiment, the server usage rights 510 associated with the server repository 508 can be used tell the server repository 508 what the server repository 508 can and cannot do. In an exemplary embodiment, such usage rights need not become permanently associated with the item 502.

In an exemplary embodiment, the conjunction of the usage rights 504 associated with the item 502 and the usage rights 510 associated with the repository 508 can be transitory, for example, existing long enough to enable an analysis of the various types of usage rights so that a decision can be made about what function to perform. The usage rights 510 associated with the repository 508 can be used to send the item 502 or information about the item 502 or the usage rights 504 associated with the item 502 to another location, such as a network, node, router, other repository, and the like, where a decision can be made or where the item 502 can be re-routed.

In a further exemplary embodiment, the item 502 need not be sent to such a location, but rather reference can be made to the location for a determination, in which case information about the item 502 or the associated usage rights 504 thereof can be sent. Similarly, the usage rights associated with the item 503 can be used to send the item 502 or such other information to another such location. In a further exemplary embodiment, usage rights can be used to specify that the item 502 is not to be sent to a location or reference made to such location or can go no further than a specified location.

In an exemplary embodiment, the usage rights 510 associated with the repository 508 can be used to inform the repository 508 that the repository 508 can render any suitable item 502, such as a digital work other item presented to the repository 508. In a further exemplary embodiment, the usage rights associated 510 with the repository 508 can be used to specify that the repository 508 can perform any suitable action requested of the repository 508, for example, except rendering. In a further exemplary embodiment, the usage rights 510 can be used to specify that the repository 508 can do any suitable action requested of the repository 508, including rendering, except that the repository 508 is restricted from rendering certain types of files, such as Joint Photographic Experts Group (JPEG) files, and the like.

Thus, according to the exemplary embodiments, the usage rights 510 can be configured to be permissive, for example, allowing everything or almost everything or can be restrictive, for example, allowing rendering of only JPEG files. The salient point is that the usage rights 510 can pertain to the repository 508, while other usage rights, such as the usage rights 504, can pertain to the item 502. Thus, the combination of the usage rights 504, if any, pertaining to the item 502, and the usage rights 510, if any, pertaining to the repository 508, can be used to determine what is permitted. The exemplary embodiments thus include the exemplary systems and methods described herein, wherein repositories can associate, pass on, and the like, usage rights to an item.

In an exemplary embodiment, the actions of the repository can be applied to particular digital works or items or to groups or classes of such digital works or items. In an exemplary embodiment, usage rights can be used to specify that a repository can perform an operation requested, for example, based on certain conditions being met. In an exemplary embodiment, such conditions can be dynamic and can be based on state variables, and the like. For example, a repository can be permitted to perform an operation with respect to an item, if a digital ticket is present corresponding to such an item. In an exemplary embodiment, the repository can be informed by the usage rights associated therewith to perform an action, for example, with respect to an item which bears a certain watermark or is signed in a certain way or otherwise is identifiable in some way. Such identification can be based on factors, such as what the item is, such a video file, music file, and the like, where the item is from, such as from a trusted source or any other suitable factor.

In an exemplary embodiment, association of usage rights to a repository can be used to determine the actions that can be performed with respect to an item. In an exemplary embodiment, any suitable item can be presented to a repository and the repository can determine if it can perform the requested action with respect to that item.

Thus, according to an exemplary embodiment, the thing that is being managed and controlled is the repository. The repository usage rights can be controlling over usage rights associated with an item. For example, if the usage right associated with an item specifies an action that is not permitted, while the usage right associated with a repository provides that such an action is permitted, then the result can be that the repository does perform such an action. Thus, according to an exemplary embodiment, supremacy of the repository usage rights can be a default mode. In further exemplary embodiments, however, the repository usage rights can yield to the item usage rights or the repository usage rights can yield to the item usage rights subject to certain conditions specified in usage rights or on certain occasions specified in usage rights.

In a further exemplary embodiment, the thing that is being managed and controlled is an item. In an exemplary embodiment, the usage right associated with such an item can specify that an operation can be performed, for example, by a certain repository or repositories. In an exemplary embodiment, the usage right can be used to grant plural rights and specify that some subset of such rights can be performed by certain repositories or that all rights must be performed by certain specified repositories. This concept can be thought of as conditions on the rights associated with the item.

In an exemplary embodiment, the usage right associated with an item need not grant any particular rights or specify any particular conditions, but rather can function to point or refer the item to a repository. In an exemplary embodiment, the usage rights of the repository can define and determine what actions are permitted with respect to such an item. Thus, the usage rights associated with an item can be used to present or point the item to a specified repository or repositories. In a further exemplary embodiment, there can be provided one or more of such pointers. In an exemplary embodiment, an item or information about the item can go to any of the suitable locations allowed by such pointers or can be used to attempt to locate a place that will permit the action requested.

In an exemplary embodiment, via appropriate usage rights, an enterprise can be configured to grant scientists of the enterprise the right to render, for example, by viewing or printing, and the like, digital documents in a central repository, such as technical resource library of the enterprise. In an exemplary embodiment, such usage rights can be used to specify that the scientists can be given the right, for example, to download one copy from the central repository to a personal computer, while not being permitted others actions to be taken, such as to transfer the downloaded document. Advantageously, a year later the enterprise can make a business decision that allowing such printing was not a good idea, and can specify via modified usage rights that such printing is no longer allowed, with such a rule being applicable to documents previously downloaded to the personal computer of the scientist.

In an exemplary embodiment, when the scientist accesses a digital document in the technical resource library, the usage rights associated with the document, for example, can be used to permit viewing of the document, printing of the document and downloading of one copy of the document to the personal computer of the scientist. In an exemplary embodiment, the downloaded copy of the document can include the usage right to view and print the document associated therewith. In an exemplary embodiment, such a usage right also can be used to specify that the print right can be exercised on an authorized rendering repository, such as a specified printer, and the like. In a further exemplary embodiment, such a usage right can provide that the document can be printed on a group of authorized printers, such as printers on a network of the enterprise.

Accordingly, when the scientist presents the document to an unauthorized printer for rendering, printing is not performed because the scientist does not have a right to print on unauthorized printer. However, when the document is presented to an authorized printer, for example, a printer on the network of the enterprise, the document can be printed. In an exemplary embodiment, an attempt to access an unauthorized printer or a certain printer or in general an unauthorized repository or a repository so designated by usage rights or system design can result in consequences, such as the item or the usage right or both being impounded or held for machine or human intervention, and a report being made concerning the attempt. Thus, according to the exemplary embodiments, a usage right can be used to specify that a condition of exercise of a right is that an item is not presented to an unauthorized repository and, optionally, what consequence follows from the unauthorized presentation.

In an exemplary embodiment, the authorized printer or printers can have usage rights associated therewith. Initially, the usage rights associated with the authorized printer or printers permitted the printing of digital documents having usage rights associated therewith that permit printing. However, when the enterprise makes the decision to prohibit printing of such documents from the technical resource library, advantageously, the enterprise can change the usage rights associated with the authorized printer or printers. In an exemplary embodiment, such a change can be a general change, such as prohibiting printing of all documents or a specific change, such as prohibiting printing of a document with certain characteristics or which is not accompanied with an appropriate authorization, such as a digital ticket, and the like.

Accordingly, when the scientist attempts to print the document, the printer can check the usage rights associated therewith and can determine that the document presented to the printer is not allowed to be printed. Advantageously, with the exemplary embodiments, the enterprise can successfully prevent printing of the technical documents without having to retrieve copies of documents, change usage rights already associated with documents or take other actions. In addition to printer applications, the exemplary embodiments can be applied in a general way to implement various other types of other applications, for example, involving many types of transactions and rights.

In an exemplary embodiment, a repository need not be a single set of functional specifications, and need not be or reside in a single device or software program. Thus, a repository can include a virtual repository, for example, including plural computers, printers, storage devices, faxes, processors, and the like. Such a virtual repository can be thought of as turning multiple devices or functionalities into a single virtual device or functionality. For example, a home network can be configured as a single repository, can employ a distributed computing capability and can include plural repositories connected within a trust zone. Thus, in the exemplary embodiments, a repository with usage rights can be a repository, which can include a virtual repository. In an exemplary embodiment, when such a virtual repository has usage rights associated therewith, other repositories within the group including the virtual repository can have respective usage rights or derive such respective usage rights from another repository, such as another repository within the group, a central node of the virtual repository or a central control repository.

In an exemplary embodiment, a central control repository can be used in conjunction with various other repositories, item types, actions, and the like. In an exemplary embodiment, usage rights associated with an item can point or refer to such a repository and can constitute or include a pointer. In an exemplary embodiment, the central control repository can be connected through a communications network, such as the communications network 170, to other repositories or devices capable of performing specific functions, such printers, routers, computers, music players, e-mail servers, copying machines, storage repositories, video players, DVD media players, and the like. In an exemplary embodiment, the central control repository can be employed as a virtual repository.

Figure 7:
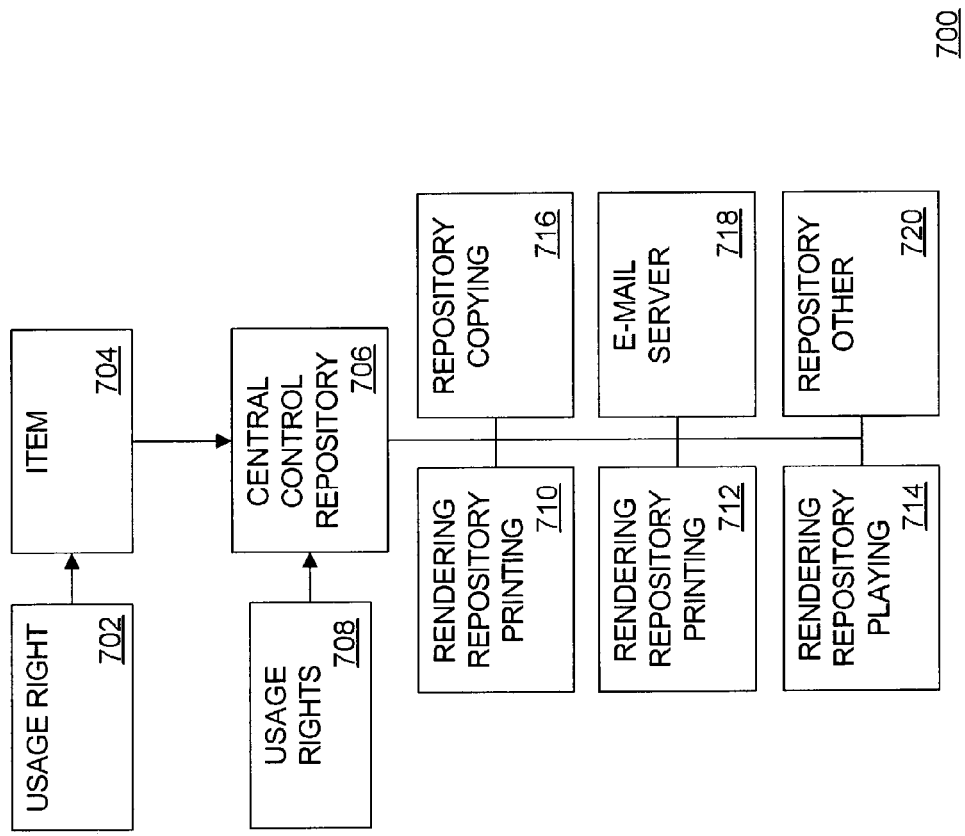
FIG. 7 illustrates an exemplary Digital Rights Management system in which a central control repository with usage rights associated therewith controls functions to be performed with respect to an item.

FIG. 7 illustrates an exemplary Digital Rights Management system 700 in which a central control repository with usage rights associated therewith controls functions to be performed with respect to an item. In FIG. 7, a usage right 702 associated with an item 704, such as a digital work or other item, can be used to point to a central control repository 706. In an exemplary embodiment, the usage right 702 associated with the item 704 can refer to the central control repository 706 as the place that specifies what usage rights pertain to the item 704. In a further exemplary embodiment, the usage right 702 can be used to define usage rights pertaining to the item 704, but further specify that such rights can be exercised only through the central control repository 706. The reference to the central control repository 706 can be thought of as a condition on the right to exercise rights specified in the usage rights 702.

In an exemplary embodiment, the central control repository 706 can have usage rights 708 associated therewith that control the actions, functions, and the like, the repository 706 is permitted to perform. In an exemplary embodiment, the usage rights 708 can be of any suitable type, for example, including usage rights general in nature or specific in nature or therebetween. For example, a general usage right 708 can include disallowing printing of the item 704, such as a document, and the like, even if the usage rights 702 associated with the item 704 permit printing or not allowing the routing of the item 704, such as an e-mail, and the like, to an e-mail server 718, if the item 704 is larger than one megabyte, even if usage rights associated with the item 704 permit e-mailing thereof.

In an exemplary embodiment, a specific usage right 708 can include permitting usage rights 702 of the item 704, such as a movie file, music file, and the like, to be upgraded to permit viewing of the item 704, even if the right to view usage right 702 associated with the item 704 has expired because the time allowed for viewing has expired. In the exemplary embodiments relating to the technical resource library, the usage right 708 can be used to specify that a certain identified document from the technical resource library may not be printed.

In an exemplary embodiment, the central control repository 706 can be configured to analyze the usage rights 708 and the usage rights 702 of the item 704, for example, to determine what functions are permitted, what action to take, and the like. In an exemplary embodiment, if a request to perform a function or action is not permitted, such a request can be denied. If, however, the requested function or action is permitted or if some of plural requested functions or actions are permitted, then the central control repository 706 can rout the request to repository or other device authorized to perform the requested function or action. In a further exemplary embodiment, the central control repository 706 can be authorized and capable of performing a given function, wherein the routing step need not be employed.

Thus, according to an exemplary embodiment, if a print function is requested, the central control repository 706 can route the request to a printer 710 or 712. Advantageously, the request can be routed to any suitable printer requested. However, if either the usage right 702 or 708 specify printing on a designated printer or printers, for example, such as the printer 710, then the request can be routed to the authorized printer or printers.

In a further exemplary embodiment, if both printed copy and a digital copy are requested, the request can be routed to the printer 710 and a repository 716 capable of performing the function of making a digital copy. In an exemplary embodiment, an attempt to exercise an unauthorized right can result in a consequence, such as the item or a usage right or both, being impounded or held for machine or human intervention or a report being made concerning the attempt or other consequence. Thus, a usage right can be used to specify that a condition of exercise of the right is that an unauthorized action is not attempted and, optionally, what consequence follows from the unauthorized attempt In an exemplary embodiment, one or more of the repositories 710-720 can have usage rights (not shown) associated therewith. In an exemplary embodiment, there can be as many layers as a system designer desires to implement. For example, the e-mail server 718 can have associated therewith usage rights that are specific to the e-mail server 718 and which define what the e-mail server 718 can and cannot do.

In an exemplary embodiment, for example, the usage rights associated with the e-mail server 718 can cause the e-mail server 718 to not process the item 704, even though the central control repository 706 and the usage rights 702 associated with and the item 704 do not prohibit such processing. For example, the repository performing copy functions 716 via suitable usage rights associated therewith can be configured to refuse to make a copy of the item 704 or impose a condition on making such a copy, for example, such as payment of a $1 fee, notwithstanding a determination by the central control repository 706 based on analyzing the usage rights 702 and 708 that a copy can be made. In further exemplary embodiments, one or more of the repositories 710-720 can be configured as a virtual repository.

In an exemplary embodiment, if usage rights associated with one repository, for example, the copier repository 716, and the usage rights associated with another repository, for example, usage rights 708 associated with central control repository 706, are in conflict or can result in conflicting transactions or do not deal consistently with the same transaction, for example, where the copy repository 716 disallows printing, but the central control repository usage rights 708 does not disallow printing, but also does not expressly allow printing, a decision resolving the primacy of the respective usage rights can be made, for example, based on one or more rules.

In an exemplary embodiment, a repository can perform a function, for example, if a repository or an item is configured in a particular way. For example, an artist may want to permit printing of black and white versions of the item 704, such as a digital work of the artist, for example, including art, but prohibit printing color versions. The usage rights 702 associated with the item 704 can provide that the item 704 can be printed only on a black and white printer. Accordingly, in an exemplary embodiment, a condition can be used to ensure, for example, that the printer 712 be configured in a certain way, such as being configured to only print the item 704 in a gray scale format. For example, such a condition can specify that there must be detected the presence of a black only print cartridge in the printer 712. In an exemplary embodiment, the cartridge can be identified in any suitable manner, for example, including the identification of the presence of a hardware or firmware element, such as via CRUM technology for identifying a print cartridge.

In an exemplary embodiment, such a condition can be used to specify that the item 704 can be printed, if a particular type of print cartridge, such as a print cartridge of a specific manufacturer, is present in the print repository 712. In an exemplary embodiment, the condition specifying the presence of the specific print cartridge can be associated via corresponding usage rights with one or more of the item 704, the printer repository 712 or the central control repository 706. In a further exemplary embodiment, the condition can be used specify that the printing is allowed only with authorization, such as by presenting a digital ticket, and the like. The exemplary embodiments, advantageously, can be applied to the configuration of any suitable repository or sub-repositories, such as a repository dependant in some way on another repository.

In an exemplary embodiment, the item 704 need not have usage rights associated therewith, wherein the analysis of usage rights by the central control repository 706 can be of the usage rights 708 associated therewith. In the exemplary embodiments, the central control repository 706 or one or more of the other repositories 710-720 can be configured to examine and analyze other attributes about the item 704, such as meta data, the type of file, the size of the file, the presence or absence of an appropriate digital ticket, watermark or security indicator, the absence of tampering or any other suitable characteristics. One or more of such characteristics can be used as part of the process to determine which of the repositories 706 and 710-720 can process the item 704. For example, if a determined characteristic of the item 704, such as a music file, movie file, and the like, is that the item 704 is over one megabyte in size, the determination may be to not e-mail the item 704, notwithstanding that e-mailing was requested by a user.

In an exemplary embodiment, when usage rights are associated with repositories, usage rights need not be associated with an item, such as a digital work or other item. For example, the item can have a pointer or reference to a place to go to find what can be done with the item. In an exemplary embodiment, such a place can be a repository, which can have usage rights associated therewith. In a further exemplary embodiment, the repository to which the item can be pointed can be an authorized place to go to have usage rights assigned to the item or a place to go to be re-routed to another repository.

Thus, according to the exemplary embodiments, the thing being bound or associated to an item, such as a digital work or other item, can be a way, such as by employing a pointer, to locate a repository authorized to determine what can be done with the item. Advantageously, the exemplary embodiments can be employed in resource-constrained environments, because a reference can consume less space than the information expressing the corresponding usage rights.

In an exemplary embodiment, a repository can be configured to analyze any suitable item presented to the repository and determine, based on usage rights associated with the repository, characteristics of the item or what functions can be performed with respect to the item. Thus, advantageously, an item need not have a pointer associated with the item to direct the item to a particular repository in order for a repository to analyze the item and perform functions or actions. Accordingly, with the exemplary embodiments, a repository can be configured perform an analysis and functions or actions on any suitable item presented to the repository or on any suitable item presented from an authorized source, for example, such as from the central control repository 706, or which is otherwise identified as being an item which the repository is authorized to analyze or process.

Advantageously, the processing of items not having usage rights associated therewith through repositories having usage rights associated therewith can be utilized in various types of business applications, but can be particularly useful within an enterprise or any other suitable kind of a closed environment. For example, an enterprise including a government department can include an internal network connecting to stationary or transportable client devices, such as laptop computers, PDAs, and the like. In an exemplary embodiment, usage rights can be associated with appropriate repositories, such as servers, and the like, for example, including the central control repository 706. Thus, any suitable item moving off of a client device can pass to or through a repository having usage rights associated therewith and which can examine the item and make determinations concerning the item. In an exemplary embodiment, such a determination can include assigning usage rights to the item, wherein such usage rights can include state information or conditions including dynamic conditions.

In an exemplary embodiment, a client device can be configured so as to not communicate external to the device, for example, external to the bard drive of the device, except through the network of the enterprise or through authorized repositories or devices. For example, in a situation where the stakeholder is a government, a law can be configured to require that all or certain items, such as digital traffic moving into and/or out of a country, government department or other environment go through one or more authorized repositories. Advantageously, the repositories can be configured to examine such items and analyze and process such items in accordance with usage rights associated with such repositories.

In a further exemplary embodiment, the repositories can be configured to examine any suitable characteristics of an item, such as a media type, content, security type, size, watermarking, origin, author, and the like. If the item also has usage rights associated therewith, such analysis can include comparing usage rights associated with the item to those associated with the repository. Accordingly, the exemplary systems can be configured for an entity, such as the government, and the like, which can decide that usage rights or certain usage rights associated with an item can or will be disregarded and items will be processed in accordance with usage rights associated with a repository, notwithstanding usage rights associated with the item.

In an exemplary embodiment, if an item is encrypted or otherwise protected in some fashion, the exemplary systems can be programmed or configured to refuse to process such an item. Advantageously, items with usage rights not authorized by a stakeholder need not be processed, for example, need not leave or enter the country or other environment, unless such usage rights can be overridden.

The exemplary embodiments are applicable to entities other than governments, such as business or personal enterprises. For example, the stakeholder can be a parent controlling access to information entering or leaving the home, for example, utilizing a network, such as wireless network, a WiFi network, a home network, and the like, and a repository through which traffic into or out of the home can be processed. In an exemplary embodiment, such control and processing can be for any suitable reason, such as for audit or census or censorship or control or security reasons.

In an exemplary embodiment, a function performed by a repository with respect to usage rights can include applying usage rights to an item, such as a digital work or other item. Thus, according to the exemplary embodiments, any suitable items entering and/or leaving a country or other environment can have usage rights associated therewith by a repository, such as an authorized repository, with the result that the item then can be used inside or outside the country or other environment, in accordance with the usage rights associated therewith by the repository. In an exemplary embodiment, the enforcement of such usage rights can be performed, for example, as disclosed in the commonly-assigned U.S. Pat. Nos. 5,530,235, 5,629,980, 5,634,012, 5,638,443, 5,715,403, 6,233,684, and 6,236,971, incorporated by reference herein.

In a further exemplary embodiment, it is not necessary that a client device present an item, for example, to a network of an enterprise, and the like, for the item to be analyzed or operations performed with respect to the item, such as assignment of usage rights to the item. Thus, in an exemplary embodiment, repositories, such as authorized repositories, connected to a network or other environment of an enterprise or other stakeholder can be configured to access client or other devices and for items found residing therein, analyze the items, make decisions or take actions concerning such items.

Accordingly, in the exemplary embodiments relating to an enterprise with scientists who have accessed items, such as digital works or other items, from a technical resource library and have retained a copy on personal computers thereof, advantageously, can be further extended. For example, a networked repository, such as the central control repository 706, can be configured access a client device, such as the personal computer of the scientist, locate and access the appropriate digital work or other item, such as a document from the technical resource library, and change the usage rights associated with the item, for example, including associating a new usage right such that the item can no longer be printed, advantageously, allowing print rights previously granted to be rescinded.

Figure 8:
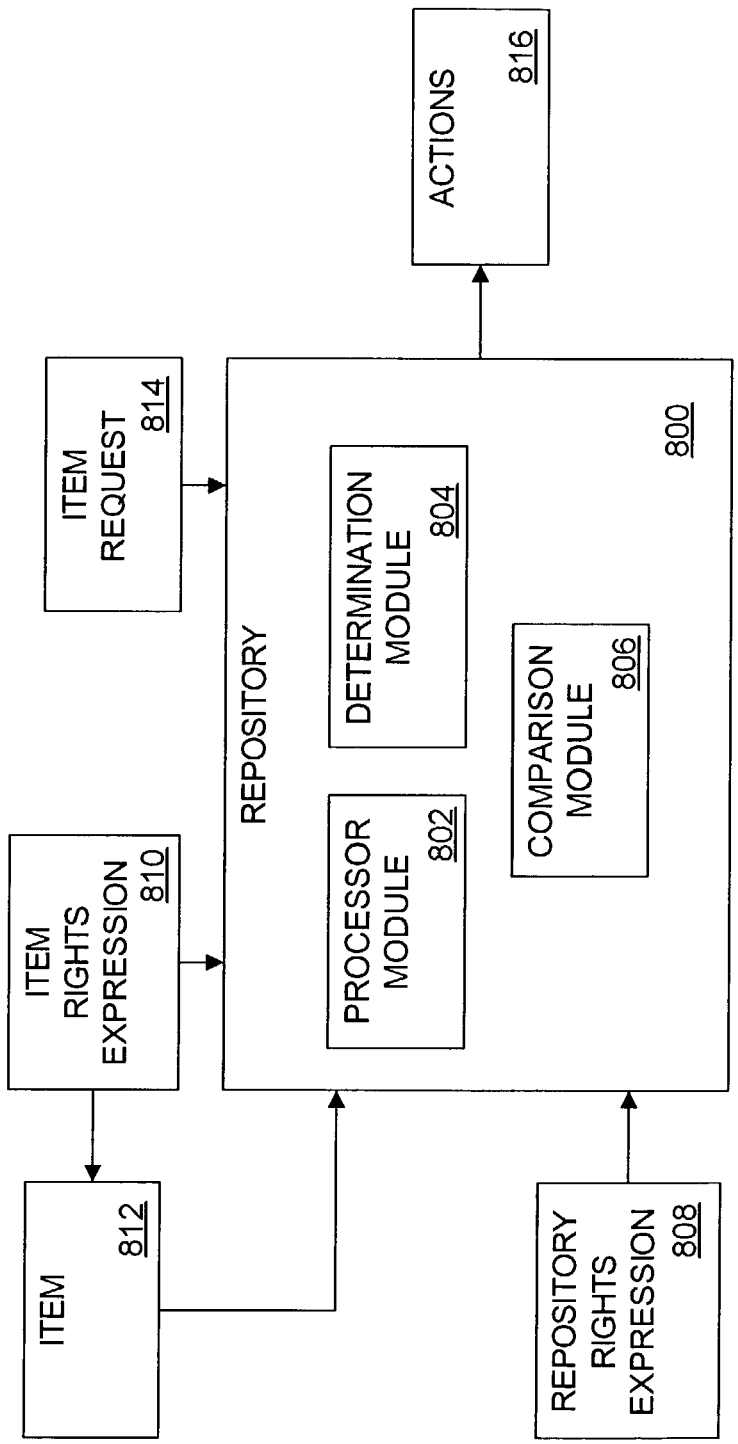
FIG. 8 illustrates an exemplary repository that can be employed in the exemplary systems of FIGS. 1 and 5-7.

FIG. 8 illustrates an exemplary repository 800 that can be employed in the exemplary systems of FIGS. 1 and 5-7. In FIG. 8, the exemplary repository 800 can include a processor module configured to process, such as interpret, a rights expression 808 in the form of a usage right associated with the repository 800, for example, specifying a manner of use of an item 812, a condition of use of the item 812, and the like, at the repository 800.

The exemplary repository 800, for example, also can include a determination module 804. The determination module 804 can be configured to determine, based on the rights expression 808 and/or one or more rules, what action or actions 816 the repository 800 can take when the repository 800 processes the item 812 or the repository 800 receives a request 814 for the item 812.

The exemplary repository 800, for example, also can include a comparison module 806. The comparison module 806 can be configured to compare a rights expression 810 associated with the item 812 and, for example, specifying a manner of use, a condition of use, and the like, of the item 812, with the rights expression 808 for the determination module 804 to determine the action or actions 816.

In an exemplary embodiment, a rights expression in the form of a master license, for example, can include master usage rights and can be stored in one or more repositories. The master license can include usage rights pertaining to an item, such as a digital work or other item. A user, customer, consumer, distributor, and the like, of an item can have a reference or pointer that can be associated with the master license.

In an exemplary embodiment, many persons can hold a pointer or reference associated with a common master license, but in further exemplary embodiments a single person can hold such a reference or pointer. In further exemplary embodiments, however, there can be more than one copy of a master license, for example, residing on servers located on different Local Area Networks (LANs) or devices, such as servers located in various geographies. In an exemplary embodiment, the multiple licenses can be similar or different. For example, it can be desired that a master license applies to the whole world, except for France, and that a variant of such as master license applies to France. In an exemplary embodiment, an appropriate reference or pointer for clients or persons to be associated with the France variant of the master license can be provided.

In an exemplary embodiment, a master license can include all the usage rights and conditions pertaining to an item, wherein, advantageously, a user need only possess a reference or pointer to such a master license. Advantageously, the exemplary embodiments can be useful in resource constrained environments, because a reference or pointer can consume less space than the information expressed in the master license. In an exemplary embodiment, the master license can specify less than all usage rights and conditions. For example, some rights and conditions can be specified in separate usage rights including, for example, usage rights specific to each instance of an item.

In an exemplary embodiment, the reference or pointer can employ any suitable mode of communications, such as a hyperlink, an offline mode of communication, such as coupling two hardware devices or communication within a single device. For example, a repository including a master license associated with a movie can be on a same computer hard drive as the repository in which the movie is stored. There can be a pointer or reference establishing a correspondence between usage rights specified in the master license and the movie, even though the usage rights and the movie are on the same device.

In an exemplary embodiment, the master license can specify the usage rights and conditions that are to be associated with an item, wherein a reference or pointer can point to the master license. In an exemplary embodiment, when a possessor of an item, such as a digital work or other item, desires to access the item, such as to render the item, copy the item or move the item to another repository, the master license can be accessed. The purpose of the access can be to determine that the right to perform the proposed transaction, such as to render the item or copy the item, can be associated with the item and to check and fulfill any suitable conditions, such as to payment of a fee, and the like.

In an exemplary embodiment, such a check can be performed in each instance of attempted use, for example, to implement dynamic changes. In further exemplary embodiments, however, such a check can be performed at various times, frequencies, and the like. For example, every time a user wishes to render or take an action, such as copy or move, with respect to an item, the master license can be checked for a current state of the usage rights therein, for example, by interpreting, and the like, the master license. In an exemplary embodiment, if the master license can be determined to have changed, the master license can be interpreted differently than when the master license was last referenced. Accordingly, an action that was permitted yesterday may not be permitted today or a requested action denied yesterday may be permitted today. In an exemplary embodiment, the master license can be changed at any suitable time.

In an exemplary embodiment, a master license can be held by an issuer thereof or by some authority other than the issuer. For example, a studio owning a movie can employ an agent who can administer the master license for the studio. In an exemplary embodiment, the studio can maintain legal control of the master license, even thought the agent can hold or maintain physical control of the master license. In an exemplary embodiment, the studio or an agent thereof can change the master license as necessary. In a further exemplary embodiment, however, a master license also can be held outside of the control of the issuer of the master license, for example, under the control of a government authority or entity.

In an exemplary embodiment, a digital ticket that points to a reference or pointer that in turn points to a license, including a master license, can be employed. For example, a consumer can hold a digital ticket issued by a rights holder or other stakeholder, such as issued by a content owner as a rights holder or a government as a stakeholder, wherein the digital ticket includes a pointer to a reference pointer. In an exemplary embodiment, the reference pointer can be hosted, controlled, and the like, by the rights holder, which can include the item or content owner or another stakeholder.

In a further exemplary embodiment, however, a digital ticket need not be employed. For example, a pointer can be associated with an item, such as a digital work or other item, and included as part of a license including the usage rights associated with the item. As with the exemplary digital ticket embodiment, such a pointer can point to a reference pointer, which in turn points to the actual license, for example, including a master license. Thus, in an exemplary embodiment, a user, consumer, distributor, and the like, of an item, can hold a usage right, which is or can include a pointer to a reference pointer. The reference pointer can be hosted, controlled, and the like, by a rights holder, which can include a content owner or another stakeholder.

Thus, according to the exemplary embodiments, a reference pointer can be configured to point to an actual usage right, advantageously, providing flexibility for implementing changes in usage rights. For example, a change can be implemented by merely changing the actual usage right being pointed to or can be implemented by having the reference pointer change the place, for example, the usage right, to which the reference pointer is pointing. Because the change of the pointer to the usage right occurs at the reference pointer, advantageously, the pointer associated with a digital ticket or a license need not be changed.

In an exemplary embodiment, the person issuing a digital ticket, a license, a usage right, and the like, need not be the same person hosting or controlling the reference pointer. For example, the issuer can be the owner of an item, such digital content, a digital work or other item, and the reference pointer can be hosted or controlled by another stakeholder, such as a government authority or an authority within an enterprise. For example, in the exemplary embodiments relating to scientists accessing documents from a technical resource library, if the information technology office of the enterprise controlled the reference pointer, such an office can implement a technology action to change a right to make printed copies by the scientist, advantageously, avoiding a need to implement a change in a particular instance of a digital document.

In an exemplary embodiment, the license 142 can provide flexibility and can be used in various ways. For example, the license 142 can be used to access a Web site, wherein, as a condition of access to the Web site, the license 142 can include a condition that the user must be located in a specific geographical area, for example, in the United States. This can be useful for localization of the Web site, for example, in terms of language translation, customization or other aspects at the property right, including local customs, news, culture, hobbies, local sport news, local news makers, local industry, local merchandise or local advertisements. For example, if the user is located in the United States, the language can be English and American versions of spelling and dialect can be used. In further exemplary embodiments, advertisements can be based on American taste, season or political climate at that moment. Thus, the exemplary embodiments enable localization, increasing the appeal of the Web site, facilitating provisioning of appropriate property rights and generally improving customer satisfaction and traffic of the Web site or the volume of sales.

Advantageously, the exemplary embodiments enable a property owner, for example, to release a specific property right in the United States first and three months later in Europe or another part of the world. This is common in movie industry, where the different releases in different geographical areas are restricted based on a time schedule designed to give maximum benefit to the owner or other recipient of revenue. The release dates and/or time tables can be incorporated into a rights template, so that the assignment or modifications of the time table can be easy for the content owner, and keeping track of the various times can be done automatically, without further human intervention.

The exemplary embodiments are applicable Web crawlers for collecting data from a Web site. For example, a Web master or other authority in control of a Web site can, as a condition of access to the Web site, require the crawler to access or request the access after midnight when the Web site traffic is at a minimum, and therefore loads are reduced. Additionally, the Web site can impose varying conditions on the ability or right of the Web crawler to access the site, such as by specifying that the access will time out after a certain period of time, if access is obtained during peak hours.

In an exemplary embodiment, the license 142 can be used to specify how to gain access to a property right. For example, how a user may distribute content or other items, such as by super-distribution, can be specified. This gives more control to the content owner, as to where and by what method the distribution is conducted. The geographical location restriction can be one condition. The parameters of super-distribution also can be specified by the content owner as conditions, for example, to further limit the method of distribution, such as expiration date, the number of copies, and the people forbidden to get a copy, such as unfriendly customers or known hackers.

In an exemplary embodiment, one user may want to share their personal calendar with others. Access to the calendar can be the item specified in the item reference 134*a*, which can include an access code. However, as a condition of the license 142, the user may require the accessing party to do a specific task. For example, a condition may require the user to open one specific file or share a calendar of the user. The calendar can be used and edited by all or some of the other persons, who can be given the right to input, modify or edit, as expressed in usage rights of the license 142. Some of the parties can be given the right to view only or view and input only, with no modification rights. The calendar can keep track of conflict of schedules for two or more people, and automatically notify the conflicting parties or all of the parties about the conflict. The calendar also can highlight the unavailable days, when one or more parties are out of town or unavailable for other reasons. The calendar also can suggest some days or hours that the calendar is relatively empty or for specified parties find the common acceptable dates or hours, based on the input by one or more users.

In an exemplary embodiment, a property right that can be controlled can include access to a print shop service, wherein a policy to restrict the access of users to printing services specified by the item ticket 134 can be employed. For example, access to the service can be specified in the item reference 134*a* and restrictions can be expressed as usage rights and conditions of the license 142. For example, the user can send a large file to be printed by the print shop, for a fee. However, as a way of managing job orders, smaller files that can get printed sooner, for example, can have a higher priority. The size of the files within a predetermined time frame can be compared and ordered for printing purposes. For example, a condition of license 142 can be that no smaller files are queued for printing. The status of other files queued for printing can be tracked as a state variable. However, if a job must be printed before a deadline, then the length of the printing process can be estimated, and the job schedule can be modified to make the deadline. This out-of-order prioritization can be signified by a flag or a variable or set of variables/parameters, which can include the order of priority, the information about the deadline, and the like. In the case of the conflict of the schedules or having not enough time to satisfy all the deadlines, the jobs in a class with a higher priority can be handled before the other jobs. Thus, the size of a file to be printed can be significant within a specific class of priority.

In a further exemplary embodiment, upon payment of a fee or satisfaction of another condition, a print job might jump the queue or color jobs and black and white jobs can be routed to different printers or the user can specify the priority the user desires based on the fee paid. For assignment of print jobs, priority assignment, class of print jobs, negotiating the prices and fees, and the moving of priorities, rights to customers and print jobs can be assigned, and such rights can be expressed in the license 142.

In an exemplary embodiment, a service provider can set conditions for quality in the rights label 132. For example, a lower quality image can be purchased for a lower fee or a slower delivery can be granted for a lower fee. For example, the resolution can be set to corresponded to the price, based on a table, a formula, a function or values on a curve. Further exemplary embodiments apply to variations other than quality, such as, speed or timing, and the variation can be based on conditions other than the fee paid. Advantageously, such services or items can be specified in the item reference 134a.

Another possible property right is the authority to change or set the time for a computer or other system. In an exemplary embodiment, the condition can be the identification of the person as the system administrator. Thus, the identification can be based on the role of the individual, which can be established by a smart card, ID, and the like. Such a role-based model makes it easier to effect a change in the right assignment or a change in the position of the individuals.

In further exemplary embodiments, the applying of usage rights to items can be very useful for situations in which the item provider is not the same as the item seller, such as for airfares and car rentals, in which a travel agent or other party often sells the item. For example, one or more roundtrip tickets between Boston and Chicago can be purchased from a Web site, such as an auction site, a reverse-auction site, airline direct sales, a travel agency, an individual having the property right to transfer or resell the tickets, a clearinghouse, a reseller or a distributor. The destination, the location or both can be variables. For example, an item specified in the item reference 134a of the item ticket 134 can be an airline ticket from Boston to a city in the Eastern part of the United States, a city within 2000 miles of Boston or to a city in the continental United States. The usage rights of the license 142 can include the right to exchange the ticket for another ticket within the European continent provided that a condition, such a payment of a fixed or variable fee is satisfied. In further exemplary embodiments, the usage rights can include the right to convert the ticket to cash, points, coupons, and the like, for purchase of merchandise or services from affiliated retailers. For the busy seasons or predetermined time windows, the conditions can require an extra fee for a given property right. The predetermined times can be tracked as state variables.

In an exemplary embodiment, the item ticket 134, for example, can be used to specify that the user can rent a car for six days in Boston from one of several car rental companies. The rental companies can have a contract with the clearinghouse 160 to recognize the item ticket 134 as valid and the item reference 134a can be used to specify the car rental. Usage rights and conditions, for example, can be used to specify mileage limits, drop off locations, car size, car manufacturer, pick-up locations, various equipment in the car as additional features, and the like. Accordingly, the item can include the rental of a car, for example, for six days within the month of August, and the like, and the owner of the car need not know exactly when or where they may be exercising such a property right.

In an exemplary embodiment, inventory of extra seats, for example, surplus tickets for movie seats, airline seats or rental cars, in which there need not be a one-to-one relationship, also can be adapted for distribution as a property right of an item with associated usage rights. For example, a property right to a movie ticket can be purchased from a Web site, and the property right can be exercised by redeeming the corresponding item ticket 134 at a movie theater, which can be configured accept the item tickets 134 and can have a relationship with the distributor Web site, for example, similar to the relationship that a credit card company has with various issuing banks, with respect to customers and card holders or similar to a more centralized form of control, such as employed by other credit card companies.

In further exemplary embodiments, there may be provided more than one type of distributor of rights, issuing entities, contract providers or types of the item tickets 134, and each can have their own logos, terms, conditions, associations, and the like, with possible reciprocal acceptances across boundaries of associations, advantageously, maximizing the acceptance areas and ease of use for customers, for example, similar to Automated Teller Machine (ATM) cards and banks. After honoring the item tickets 134, the theater owner, for example, can aggregate the item tickets 134 each day and obtain reimbursement.

In an exemplary embodiment, tickets or seats for events with undetermined dates or specifications can be expressed as items of property rights. In further exemplary embodiments, the item of the property right can be hotel rooms and other reserved commodities, whereby the reservations become very liquid and exchangeable by permitting transfer of the license 142 through usage rights or meta-rights.

In an exemplary embodiment, the clearinghouse 160 can have a contract with three car rental companies as vendors having Web servers 150a, for example, from which a user can rents a compact car for 6 days in August and to be used in New York City. The item ticket 134 can be redeemable to thereby exercise the property right of a corresponding license 142 from one of the three car rental companies. The usage rights of license 142 associated with the item ticket 134 can be used to specify various aspects of the property right, such as six days in August of the current year in a specific city, the ability to auction or otherwise transfer the property right, the ability to exchange the city for a fee, the ability to use part of the property right to obtain cash, and the like.

Advantageously, the flexibility in trading property rights, according to the exemplary embodiments, for example, can permits various item to be extended into an open market for trading or exchanging property rights, for example, similar to the NASDAQ stock market. In such a market, rights can become very liquid, similar to cash, stocks, bonds, certified checks, and the like. Advantageously, such property rights can be traded as commodities or objects, with certain predetermined or variable values, at the current moment or in the future, and the like. Accordingly, associating rights and conditions with items, through the mechanism of the license 142 and the item ticket 134, can provide a completely new dimension to trading of various goods, services, and the like.

In an exemplary embodiment, Internet and computer networks can be configured to provide a very fast and convenient way for the distribution of property rights to various items. However, in further exemplary embodiments, the distribution of various items can be strictly limited, for example, as specified by the item owner or as desired by the user. For example, a property right to view or use personal or private data can be provided, wherein the manner of distribution, where data is distributed, who can use the data, who should not be able to inspect, copy, distribute or use the data, and the like, can be specified as one or more conditions and usage rights in the license 142.

In an exemplary embodiment, access to private information can be treated as an item, and the exemplary usage rights management solutions can be used to safeguard such private data. For example, the exemplary embodiments can enable a user to provide private personal data to a Web site, and the Web site to sell the data to others, only if the user has granted such a property right to the Web site. One parameter of such a property right, for example, expressed as a condition, can be the tolerance level of the content owner, as can be quantified, and be represented by an integer, a descriptive name or other means. In an exemplary embodiment, such a tolerance value can correspond to geographical distribution limits, a list of authorized users, a list of unauthorized people, such as known hackers or infamous Web sites, pre-defined levels of trust, levels of security for different Web sites, pre-defined levels of privacy for different Web sites or other parameters or conditions. Such parameters, for example, can be static or dynamically determined and can be tracked as state variables.

In an exemplary embodiment, Web sites or other distribution sites, for example, can be rated by individuals based on votes or can be rated by commercial or non-profit organizations based on surprise audits or scheduled audits, and with claims or rules set on such sites compared against the criteria of a rating organization. Such ratings can be accomplished in any suitable manner. For example, the ratings can be a condition of the license 142 for determining if a party can access private information. If there is an unwanted leak of the private information to the outside, the liability of such a site, in terms of monetary compensations or otherwise, can be stated as a parameter for the calculation of the rating of the site.

In an exemplary embodiment, a condition can include an indication that a content owner is willing to sell personal data. For example, the license 142 granting access to a network or other service can have as a condition the requirement that the user grants permission to sell personal data. In further exemplary embodiments, conditions can include the price or other compensation or conditions set on such personal data. For example, the exemplary embodiments enable a content owner to receive a percentage or a fixed fee or other benefit, such as airline miles, for each sale or transaction of personal data. An aggregation of such micro-amounts, for example, can be paid at the end of each month or other period, based on the usage rights parameters in the license 142, and through one or more clearinghouses 160.

In an exemplary embodiment, personal data can be aggregated or averaged for economic, cultural, regional, national, medical or other reasons, in which the individual data for a specific person need not be individually significant. In an exemplary embodiment, the identity of individuals typically need not be disclosed. Such data can be used in the aggregate for a number of purposes, for example, for a medical or census purposes by a non-profit or trusted organization. In an exemplary embodiment, conditions can be used to specify the purpose of the collection of such data, and usage rights can be used to specify how such data can be used, such as in aggregate, on average, and the like.

In a further exemplary embodiment, a condition can be used to specify which section or part of the collection of personal data can be permitted to be used for a given purpose. Such specification can be performed using an appropriately configured user interface, for example, including a template form, with flags specifying each piece of information, and the like. For example, for a medical study, permission can be granted to access the age, height, and weight of a person, but not the name, income, credit card number, credit history or address of the person. For a census or insurance study, the accessible information, for example, can include street addresses or zip codes, the number of the accidents in the past six months, the number of cars owned per household, and the like.

In an exemplary embodiment, a content owner can specify in the license 142 that data can be exchanged in the clearinghouse 160 with another data collection entity, to average, aggregate or sell or exchange such data. Advantageously, the exemplary embodiments enable a content owner to verify the identity of the acquirer of the data and the associated level of trust in the new owner, for example, as specified conditions, on a case-by-case basis.

In an exemplary embodiment, the licenses 142 and the redemption of the tickets 134 can be tracked as state variables. Advantageously, the exemplary embodiments, thus, enable a user to enter personal data only once and then maintain or keep track of such data, wherein the user or other designated party can be informed of how the data or which part of the data is being used. The user can be notified where the data is by a tracking means, for example, including sending an e-mail messages back to the user, and the like. In a further exemplary embodiment, the user can receive remuneration from the sale or use of such personal data.

In an exemplary embodiment, an item, for example, including personal information can be divided into different components for which an owner or another authorized person can assign different values of privacy conditions. In a further exemplary embodiment, the personal information can have just one component.

In an exemplary embodiment, privacy parameters can be based on various kinds of scales. For example, a typical scale for a privacy parameter can be between 0 and 1, wherein zero can signify no privacy, such as non-conditional access, and one can signify absolute privacy, such as no access under any condition. A set of rules can be used to define the scale for the privacy parameter. Different constraints, conditions, fees, rights, and the like, can be associated with the privacy parameters and each parameter can be assigned for a given component of the personal information.

In an exemplary embodiment, the owner of content, an independent trusted organization or some other entity can set trust ratings for different entities or persons, and such trust ratings can be used as conditions of access for such entity or persons to particular information associated with a given privacy parameter. Such trust ratings can be based on a scale, such as with the privacy parameters. For example, persons with the highest possible trust ratings can be given access to information with the highest privacy parameters, and persons with the lowest trust ratings can be given access to information requiring no privacy. The middle ratings can be used to grant access to corresponding portions of the information. Thus, according to the exemplary embodiments, the content can have a rating and the viewer or user of the content can have a rating, and a condition to access the content can be that the two ratings have a complete or partial correspondence, as necessary. In further exemplary embodiments, different parts of the content can have different ratings, advantageously, providing greater flexibility.

In an exemplary embodiment, usage rights, rights offers, tickets, licenses, and the like, can be expressed by any suitable language, format, tag set, set of rules, grammar or formulations, for example, such as the XrML language, and the like. In further exemplary embodiments, the various aspects and limitations can be expressed as various combinations of items, principals, conditions, and the like. For example, a property right can be used to specify that Person A can transmit a purchase order of less than X dollars to Company C. There are numerous ways to express the usage rights and conditions of such a license in a property right, such as with the exemplary rights expressions provided below.

Exemplary Rights Expressions #1:
Principal: Person A
Item: Company C Purchasing Service
Usage Right: Transmit
Conditions: type="Purchase Order", cost<X
Exemplary Rights Expressions #2:
Principal: Person A
Item: Purchase Order
Usage Right: Transmit
Conditions: recipient="Company C Purchasing Service", cost<X
Exemplary Rights Expressions #3:
Principal: Person A
Item: Any Goods from Company C
Usage Right: Purchase
Conditions: cost<X
Exemplary Rights Expressions #4:
Principal: Person A
Item: Any
Usage Right: Purchase
Conditions: recipient="Company C Purchasing Service", cost<X
Exemplary Rights Expressions #5:
Principal: Person A
Item: Any
Usage Right: Spend<$X
Conditions: recipient="Company C Purchasing Service"
Exemplary Rights Expressions #6:
Principal: Person A
Item: Purchase Order
Usage Right: Transmit to "Company C Purchasing Service"
Conditions: cost<X
Exemplary Rights Expressions #7:
Principal: Person A
Items: Purchase Order for "Company C Purchasing Service" costing less than $X total
Usage Right: Transmit
Conditions: none
Exemplary Rights Expressions #8:
Principal: Person A
Item: Any
Usage/Right: Purchase from Company C
Conditions: cost<X From the exemplary rights expressions, it can be seen that a property right can be expressed in various ways and the restrictions can be set forth in a usage right, in the item, as conditions, and the like. Thus, according to the exemplary embodiments, how people use or access goods, services or other items, advantageously, can be specified through enforceable property rights. For example, the owner of an item or distributor of an item can be given more control over the item and the user of the item can be given better management over what property rights are obtained and at what cost.

The exemplary embodiments, thus, provide the ability to create an enforceable property right in various items and permit such items to be traded in an open market environment. While such an environment can be employed for commodities and stocks, the exemplary embodiments, advantageously, enable enforceable proper rights in goods, services, and the like. The various rights, conditions, items, other indicators, and the like, of the exemplary embodiments can be expressed in any suitable manner and can be stored at the same location or in different locations. For example, the ticket 134 can be stored at one location, such as a user device, and the license 142 can be stored at another device or location, such as the license server 140. Advantageously, the various aspects and components of the exemplary embodiments have individual utility and can exist separately. For example, the licenses 142 can exist separately from the tickets 134, and each can exist outside of a specific computer architecture or system.

The exemplary systems for distributing the tickets 134 and creating and enforcing the licenses 142 can utilize various devices, such as a personal computers, servers, workstations, PDAs, thin clients, and the like. For example, the client environment 120 can include a handheld device, such as a mobile phone, a PDA, and the like.

Various channels for communication can be employed with the exemplary embodiments and various functions can be integrated in one or more devices. For example, one or more functions performed by the license server 140 can be accomplished by appropriately configured software and/or hardware within the client environment 120. In further exemplary embodiments, one or more of the functions performed by the license server 142 or other modules for selecting rights and granting the licenses 142 can be accomplished in the same device as that used to access and redeem the item tickets 134. The disclosed functional modules are segregated by function for clarity. In further exemplary embodiments, however, the various functions of the exemplary systems can be combined or segregated as hardware and/or software modules in any suitable manner. Accordingly, the various functions can be useful separately or in combination.

The various elements, portions thereof, and the like, of the exemplary embodiments can be stored on the same device or on different devices. For example, the license 142 can be stored together with or separate from the item ticket 134. In further exemplary embodiments, the various elements of the license 142 can be stored on separate devices. For example, the values of the state variables can be stored in a state variable repository of a system that tracks the current value of the state variables. The exemplary embodiments can employ various links, references, specifications, and the like, to associate such elements.

The exemplary embodiments can be further employed for offline modes of operation. For example, the item 134 and the license server 140 can reside on the same device as the client component 122, and the activation server 110 also can reside on the same device. Such a device can include a hard drive of a personal computer or some other hand held or transportable device. Advantageously, the exemplary embodiments enable a transaction to be consummated without having to establish a communication session with another device, through the Internet or otherwise.

In exemplary embodiment, a hard drive on a personal computer can include the ticket 134 generating software, document preparation software, the activation server 110 software, and the like. Such software systems or components can provide the computing resources to prepare an item, for example, content, such as a song, movie, and the like, create the item ticket 134 and the license 142 defining the rights and conditions associated with the item and to redeem the ticket 134 in accordance with such rights and conditions. In exemplary embodiment, such software systems can communicate with each other within the hard drive of the personal computer, and the like.

In an exemplary embodiment, to the extent communication outside the client device are employed to process a transaction for some reason, for example, to make a financial payment, there can be conducted an online session at a time other than the request for or use of the item. For example, the client device can communicate with the clearinghouse 160 and make an online payment. The payment can be recorded in the device within, for example, but not exclusively, the license server 140 software component on the client device. The record can be recorded as a monetary amount, such as $100.00, or as units, such as ten viewings of a movie file or ten one-day rentals of a Hertz rental car or in any other suitable manner. Each use can be recorded and deducted from the authorized amount or number of uses. In the case of a financial transaction, it is possible to make the transaction offline using a digital storage device, such as a smart card, removable storage device, and the like. In an exemplary embodiment, information to be exchanged can be exchanged using a physical device in substitution for online communication. For example, the license 142 can be presented by inserting a card into a personal computer.

In exemplary embodiment, the customer holding the item ticket 134 can present the ticket 134 and obtain an item, such as access to service, and the like, without having to be online at the time the service is obtained. The service itself, which is obtained, can reside on a device controlled by the customer, such as a personal computer hard drive, and the like. In an exemplary embodiment, the service can include the execution of a computer program.

In further exemplary embodiments regarding car rentals, the clearinghouse 160 can have a contract with the three car rental companies as vendors 150, from which a user can rent a compact car for 6 days in August, to be used in New York City. The item ticket 134 can configured to be redeemable to thereby exercise the property right of the corresponding license 142 from one of the three car rental companies. The usage rights of the license 142 associated with the item ticket 134 can be used to specify various aspects of such a property right, such as six days in August of the current year in a specific city. The item ticket 134 can be carried by the customer as digital information on a transportable device or in the form of a displayable or printable coupon and presented to one of the vendors 150. The vendor 150 can read the digital information or extract information from a printed ticket, such as by scanning, and the like, with no need for the customer and the vendor to engage in an online form of communication.

In an exemplary embodiment, a condition for allowing access to or use of a digital work or other item may be that the repository which is requesting access or which is proposed to receive or store or in any way be involved with the item have certain attributes or otherwise be configured in certain ways or not have certain attributes or configurations. For example, the repository can be required to possess minimal security attributes. If the repository is part of a personal document assistant (PDA) device, the repository can require that the PDA have specified or minimal security attributes and that the PDA be configured to permit the PDA to support the required conditions for access.

In an exemplary embodiment, a repository, including a device, such as a PDA, personal computer, and the like, can be reconfigured before such device can be involved with a digital work or other item. For example, such reconfiguration could involve the installation of new software at the repository or system or devices that control the repository, could involve changing parameters or other settings of existing software, could take the form of a software plug in, and the like.

In an exemplary embodiment, a condition for access, possession or the involvement with a digital work or other item of any suitable kind of repository or device can be that the repository or device permits itself to be reconfigured. For example, such reconfiguration can include that the repository or device allowing itself to be accessed, for example, by the central control repository 706, for changing default settings, installing new software, modifying existing software, inserting a plug in, disabling certain software or features, and the like, for example, in a way that such changes cannot be negated or at least not easily negated.

In an exemplary embodiment, if a repository or other device will not allow itself to be accessed or configured, then such a device need not be allowed to handle the digital work or other item. In further exemplary embodiments, such a device might be denied the right to handle certain types of items or not be allowed to perform functions otherwise permitted. In further exemplary embodiments, if upon accessing the repository or device, it is determined that such a device cannot be reconfigured in a way that meets the requirement of a condition, for example, such as when a repository, even after being reconfigured does not possess a minimum level of security, then the right to access or otherwise handle the item can be denied.

In further exemplary embodiments, the purpose of access to the repository or device can be to ascertain whether or not such as device meets one or more conditions. For example, if it is determined that such as device does meet such conditions, then reconfiguration need not be necessary or if it is determined that such a device does meet such conditions in part, then limited reconfiguration could be necessary.

In an exemplary embodiment, the condition that a repository or device be reconfigurable or reconfigured, for example, can apply to any suitable type of repository or device and to any suitable function that such a device might perform. For example, a condition could apply to any repository or device which is to store a digital work or other item or which is to render the item or which is to transmit the item across a communications medium or which is a communications medium.

Figure 9:
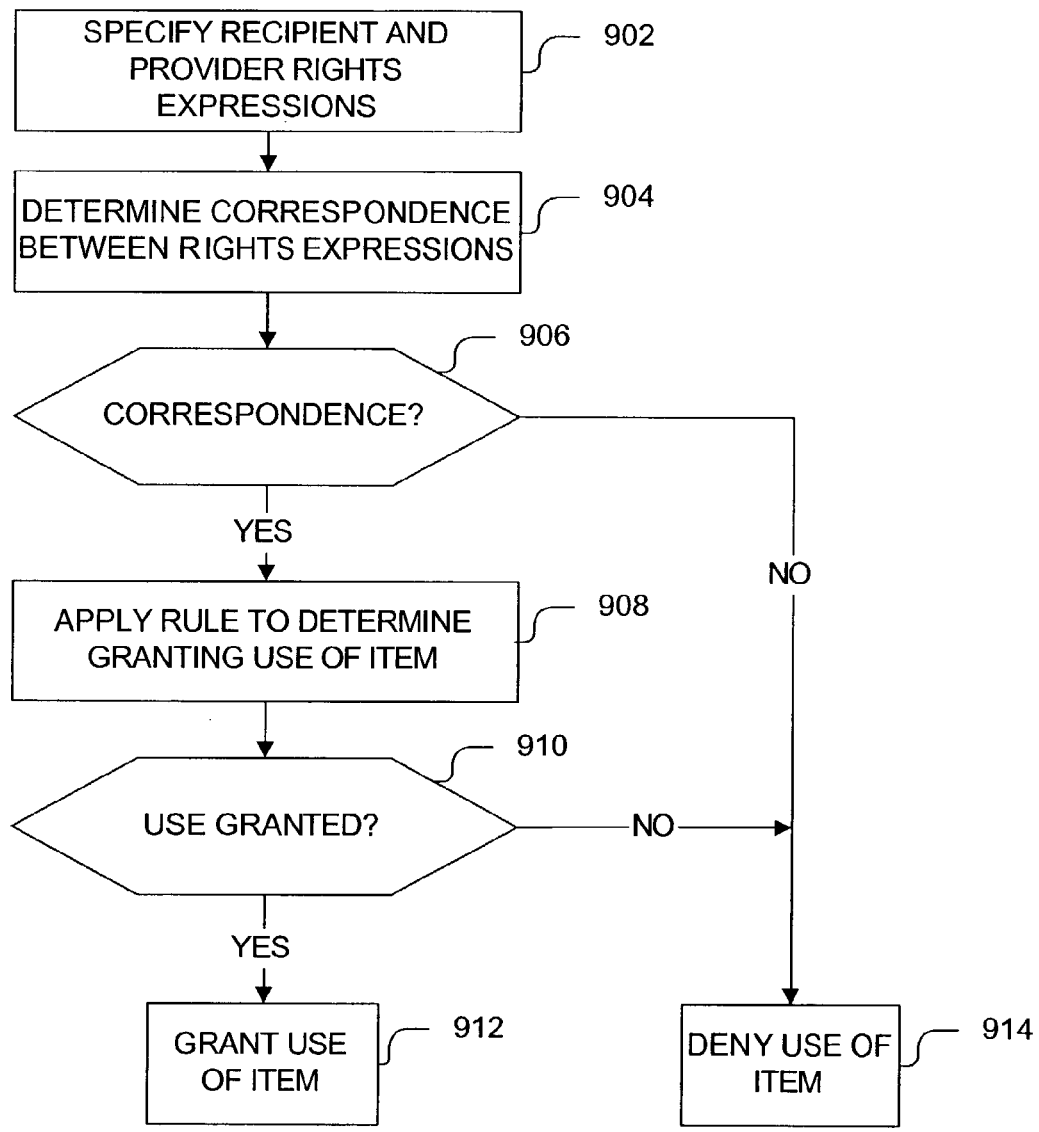
FIG. 9 is a flowchart of an exemplary process for processing rights expressions of a recipient of an item based on rules and that can be employed in the exemplary systems of FIGS. 1 and 5-7.

FIG. 9 is a flowchart of an exemplary process for processing rights expressions of a recipient of an item based on rules and that can be employed in the exemplary Digital Rights Management systems of FIGS. 1 and 5-7. In FIG. 9, at step 902 a potential recipient of an item specifies a rights expression indicating a first manner of use of the item proposed by the recipient and a provider of the item specifies a second rights expression indicating a second manner of use of the item proposed by the provider. At step 904, a correspondence between the first rights expression and the second rights expression is determined. If a correspondence can be determined, as verified at step 906, then, at step 908, a rule is applied to the determined correspondence to determine if the recipient should be granted use of the item. If use of the item can be granted, as verified at step 910, then, at step 912, the recipient can be granted use of the item. If, however, there is no correspondence or if use of the item cannot be granted, then, at step 914, the recipient can be denied use of the item.

Figure 10:
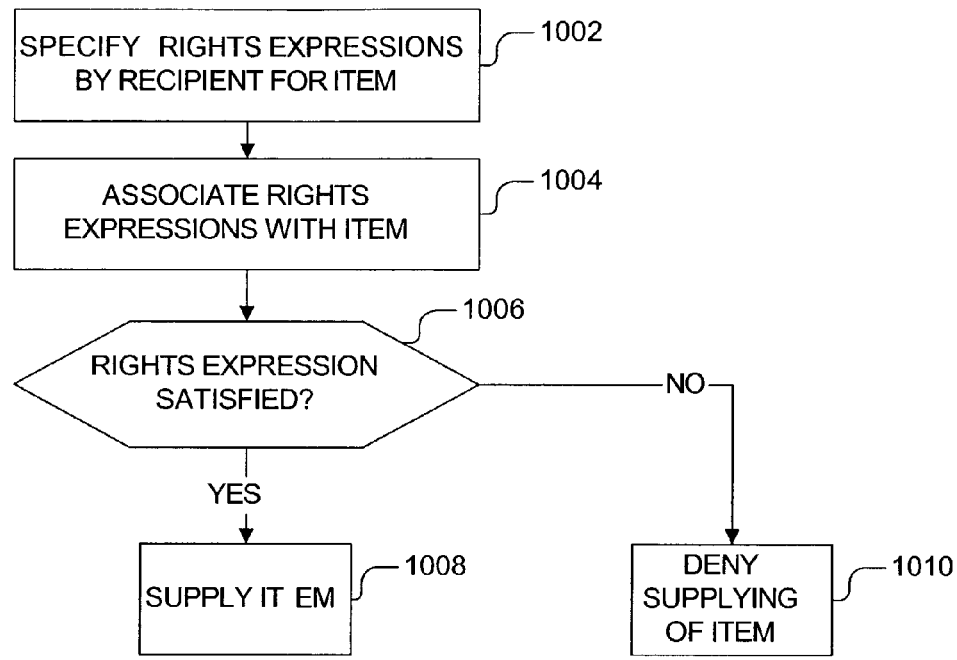
FIG. 10 is a flowchart of an exemplary process for processing rights expressions of a recipients and suppliers of an item and that can be employed in the exemplary systems of FIGS. 1 and 5-7.

FIG. 10 is a flowchart of an exemplary process for processing rights expressions of a recipients and suppliers of an item and that can be employed in the exemplary Digital Rights Management systems of FIGS. 1 and 5-7. In FIG. 10, at step 1002, a recipient of an item specifies a rights expression indicating a desired manner of use of the item by the recipient and/or a condition of use of the item by the recipient. At step 1004, the rights expression is associated with the item. If the desired manner of use of the item and the condition of use of the item can be satisfied by the provider, as verified at step 1006, then, at step 1008, the item can be supplied to the recipient. If, however, the desired manner of use of the item and the condition of use of the item cannot be satisfied by the provider, at step 1010, the item need not be supplied to the recipient.

Figure 11:
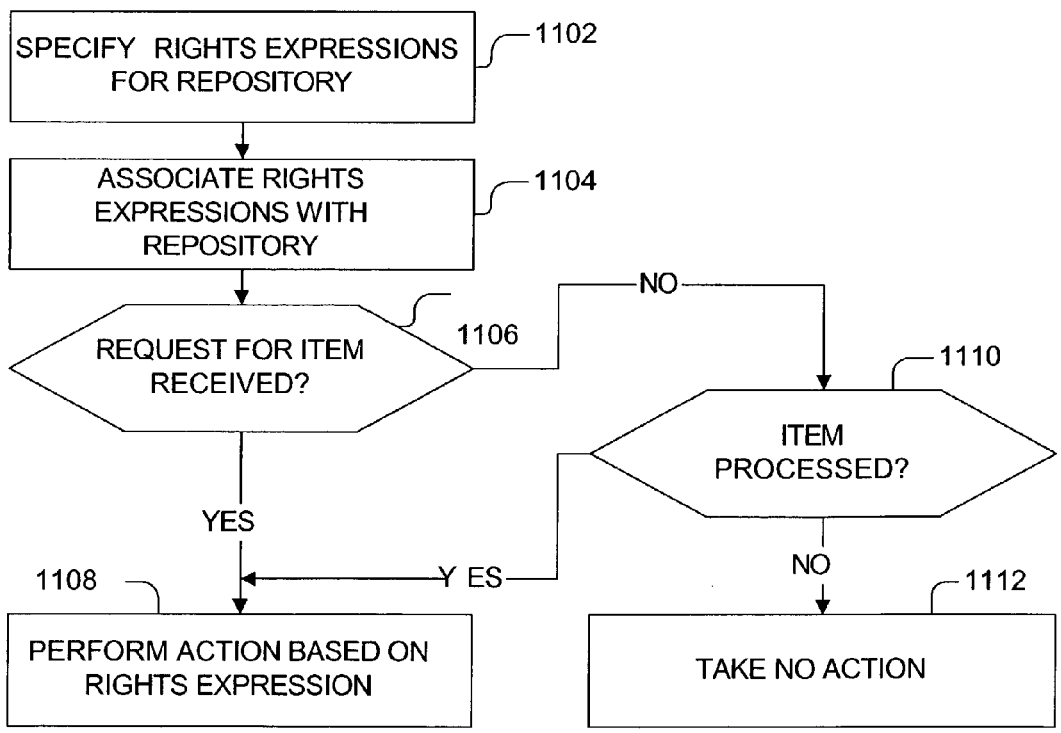
FIG. 11 is a flowchart of an exemplary process for processing rights expressions associated with a repository and that can be employed in the exemplary systems of FIGS. 1 and 5-7.

FIG. 11 is a flowchart of an exemplary process for processing rights expressions associated with a repository and that can be employed in the exemplary Digital Rights Management systems of FIGS. 1 and 5-7. In FIG. 11, at step 1002, a repository rights expression indicating a manner of use of an item at a repository can be specified. At step 1104, the repository rights expression can be associated with the repository. If a request for the item is received at the repository, as verified at step 1106 or the item is processed by the repository, as verified at step 1010, then, at step 1108, an action the repository is to take when the repository processes the item or the repository receives the request for the item based on the repository rights expression can be performed by the repository. If, however, the request for the item is not received at the repository or the item is not processed by the repository, at step 1010, no action need be taken by the repository.

Thus, according to the exemplary embodiments, a rights expression can include a tangible, for example, electronic, and the like, articulation of usage rights, conditions, licenses or portions thereof. A rights expressions can include an XrML file or fragment, but also can be expressed in any suitable language, grammar, format, alphabet, and the like. Usage rights can be expressed as a rights expression and can include a manner of use, conditions, and the like. Licenses also can include the noted elements of a usage right and can further include principals, keys, identifications, and the like. A recipient of an item of the exemplary embodiments can include a user, a distributor, a consumer, and the like, of the item. The granting of access to an item can include granting use of an item, allowing lending of an item, allowing access to an item, and the like.

The devices and subsystems of the exemplary systems described with respect to FIGS. 1-11 can communicate, for example, over a communications network 170, and can include any suitable servers, workstations, personal computers (PCs), laptop computers, PDAs, Internet appliances, set top boxes, modems, handheld devices, telephones, cellular telephones, wireless devices or other devices capable of performing the processes of the disclosed exemplary embodiments. The devices and subsystems, for example, can communicate with each other using any suitable protocol and can be implemented using a general-purpose computer system, and the like. One or more interface mechanisms can be employed, for example, including Internet access, telecommunications in any suitable form, such as voice, modem, and the like, wireless communications media, and the like. Accordingly, communications network 170 can include, for example, wireless communications networks, cellular communications networks, satellite communications networks, Public Switched Telephone Networks (PSTNs), Packet Data Networks (PDNs), the Internet, intranets, hybrid communications networks, combinations thereof, and the like. Accordingly, the communications network 170 can include one or more networks.

It is to be understood that the exemplary systems described with respect to FIGS. 1-11, are for exemplary purposes, as many variations of the specific hardware used to implement the disclosed exemplary embodiments are possible. For example, the functionality of the devices and the subsystems of the exemplary systems can be implemented via one or more programmed computer systems or devices. To implement, such variations as well as other variations, a single computer system can be programmed to perform the functions of one or more of the devices and subsystems of the exemplary systems. On the other hand, two or more programmed computer systems or devices can be substituted for one or more of the devices and subsystems of the exemplary systems. Accordingly, principles and advantages of distributed processing, such as redundancy, replication, and the like, also can be implemented, as desired, for example, to increase the robustness and performance of the exemplary systems described with respect to FIGS. 1-11.

The exemplary systems described with respect to FIGS. 1-11 can be used to store information relating to various processes described herein. This information can be stored in one or more memories, such as a hard disk, floppy disk, optical disk, magneto-optical disk, RAM, ROM, and the like, of the devices and sub-systems of the exemplary systems described with respect to FIGS. 1-11. One or more databases of the devices and subsystems can store the information used to implement the exemplary embodiments. The databases can be organized using data structures, such as records, tables, arrays, fields, graphs, trees, lists, and the like, included in one or more memories, such as the memories listed above.

All or a portion of the exemplary systems described with respect to FIGS. 1-11 can be conveniently implemented using one or more general-purpose computer systems, microprocessors, digital signal processors, micro-controllers, and the like, programmed according to the teachings of the disclosed exemplary embodiments. Appropriate software can be readily prepared by programmers of ordinary skill based on the teachings of the disclosed exemplary embodiments. In addition, the exemplary systems can be implemented by the preparation of application-specific integrated circuits or by interconnecting an appropriate network of component circuits.

Stored on any one or on a combination of computer readable media, the exemplary embodiments of the present invention can include software for controlling the devices and sub-systems of the exemplary systems described with respect to FIGS. 1-11, for driving a device or devices for implementing the invention, and for enabling the devices and sub-systems of the exemplary systems described with respect to FIGS. 1-11 to interact with a human user. Such software can include, but is not limited to, device drivers, firmware, operating systems, development tools, applications software, etc. Such computer readable media further can include the computer program product of an embodiment of the present invention for performing all or a portion (if processing is distributed) of the processing performed in implementing the invention. Computer code devices of the embodiments of the present invention can include any interpretable or executable code mechanism, including but not limited to scripts, interpretable programs, dynamic link libraries (DLLs), Java classes and applets, complete executable programs, Common Object Request Broker Architecture (CORBA) objects, etc.

Moreover, parts of the processing of the embodiments of the present invention can be distributed for better performance, reliability, and/or cost.

The computer readable medium can include any suitable medium that participates in providing instructions to a processor for execution. Such a medium can take many forms, including, but not limited to, non-volatile media, volatile media, transmission media, and the like. Non-volatile media can include, for example, optical or magnetic disks, magneto-optical disks, and the like. Volatile media can include dynamic memory, and the like. Transmission media can include coaxial cables, copper wire and fiber optics, including the wires that make up one or buses of a computer. Transmission media also can take the form of acoustic, optical, or electromagnetic waves, such as those generated during radio frequency (RF) and infrared (IR) data communications.

As stated above, the exemplary systems described with respect to FIGS. 1-11 can include one or more computer readable medium or memory for holding instructions programmed according to the teachings of the invention and for including data structures, tables, records or other data described herein. Common forms of computer-readable media can include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the exemplary embodiments of the present invention can initially be borne on a magnetic disk of a remote computer connected to the network 170. In such a scenario, the remote computer can load the instructions into main memory and send the instructions, for example, over a telephone line using a modem. A modem of a local computer system can receive the data on the telephone line and use an infrared transmitter to convert the data to an infrared signal and transmit the infrared signal to a portable computing device, such as a personal digital assistant (PDA), a laptop, an Internet appliance, and the like. An infrared detector on the portable computing device can receive the information and instructions borne by the infrared signal and place the data on a bus. The bus can convey the data to main memory, from which a processor retrieves and executes the instructions. The instructions received by the main memory can optionally be stored on storage device either before or after execution by a processor.

Advantageously, the exemplary embodiments described herein can be employed to allow a consumer or user of digital content or other items to provide usage rights specifying conditions or terms for accepting the content or items to be consumed or otherwise used. Partial satisfaction of the usage rights or conditions can be employed to allow access, including reconciling of varying or conflicting usage rights or conditions. Usage rights can be associated with a repository, which then can pass the usage rights along to the content or items. The usage rights can be used to determine what functions the repository is authorized to perform with respect to the content or items. The distribution and use of the content or items can be determined and controlled without usage rights associated the content or items, wherein the usage rights are associated with the repository, which examine, analyze, and process the digital content or other items. The exemplary embodiments can be employed in conjunction with systems where a repository handling the content or items assigns usage rights to the content or items.

Advantageously, the exemplary embodiments described herein can be employed in offline systems, online systems, and the like, and in applications, such as TV applications, computer applications, DVD applications, VCR applications, appliance applications, CD player applications, and the like. In addition, the signals employed to transmit the legality expression of the exemplary embodiments, can be configured to be transmitted within the visible spectrum of a human, within the audible spectrum of a human, not within the visible spectrum of a human, not within the audible spectrum of a human, combinations thereof, and the like.

Although the exemplary embodiments are described in terms of applications in music, games, movies, coupons, legal arenas, and the like, the exemplary embodiments are applicable to any suitable application, such as digital and non-digital content, devices, software, services, goods, resources, and the like, and can be practiced with variations in technology, interface, language, grammar, content, rights, offerings, services, speed, size, limitations, devices, and the like.

While the present invention have been described in connection with a number of exemplary embodiments and implementations, the present invention is not so limited but rather covers various modifications and equivalent arrangements, which fall within the purview of the appended claims.

What is claimed is:

1. A computer implemented method for enforcing rights expressions specifying manners of use of an item, said method comprising:
   recording, by a computing device, a repository rights expression on computer readable media as a data structure that is readable by a repository computing device, said repository rights expression indicating a manner of use of an item at said repository computing device;
   associating said repository rights expression with said repository computing device;
   recording by a computing device, an item rights expression on computer readable media as a data structure that is readable by a repository computing device, said item rights expression indicating a manner of use of said item;
   associating said item rights expression with said item; and
   determining, by said repository computing device, what action said repository computing device is to take when said repository computing device processes said item based on a combination of said repository rights expression associated with said repository computing device and said item rights expression associated with said item,
   wherein said manner of use of said item at said repository computing device indicates at least one of what action said repository computing device is to take when said repository computing device processes said item and what action said repository computing device is to take when said repository computing device receives a request for said item.

2. The method of claim 1, wherein said item includes said item rights expression associated therewith and indicating said manner of use of said item.

3. The method of claim 1, wherein said repository rights expression applies to at least one of all items that said repository computing device processes and all requests for items received by said repository computing device.

4. The method of claim 1, wherein said repository rights expression applies to one collection of specific items that said repository computing device processes and specific requests for items received by said repository computing device.

5. The method of claim 1, further comprising:
specifying a plurality of said repository rights expression indicating respective manners of use of said item at said repository computing device; and
associating the plural repository rights expressions with said repository computing device of said item.

6. The method of claim 1, wherein said step of specifying a repository rights expression comprises:
specifying in said repository rights expression that the item rights expression associated with said item overrules said repository rights expression,
wherein said combination in said step of determining considers said item rights expression overruling said repository rights expression.

7. The method of claim 1, wherein said step of specifying a repository rights expression comprises:
specifying in said repository rights expression that said repository rights expression overrules the item rights expression associated with said item,
wherein said combination in said step of determining considers said repository rights expression overruling said item rights expression.

8. The method of claim 1, wherein said item includes a pointer to said repository and said method further comprises:
providing said item to said repository computing device based on said pointer.

9. The method of claim 1, wherein said step of determining comprises:
determining the actions to be taken by said repository computing device based on a characteristic of said item.

10. The method of claim 1, wherein said item includes at least one of digital content, digital goods, digital services, non-digital content, non-digital goods and non-digital services.

11. A computer system comprising one or more memories and one or more processors and configured to perform the method of claim 1.

12. A computer-readable medium bearing instructions arranged to cause one or more processors to perform the method of claim 1.

13. A system for enforcing rights expressions specifying manners of use of an item, said system comprising:
means for specifying a repository rights expression indicating a manner of use of an item at a repository;
means for associating said repository rights expression with said repository;
means for specifying an item rights expression indicating a manner of use of said item;
means for associating said item rights expression with said item; and
means for determining what action said repository is to take when said repository processes said item based on a combination of said repository rights expression associated with said repository and said item rights expression associated with said item,
wherein said manner of use of said item at said repository indicates at least one of what action said repository is to take when said repository processes said item and what action said repository is to take when said repository receives a request for said item.

14. The system of claim 13, wherein said means for specifying, said means for determining, and said means for associating comprise devices of a computer system.

15. The system of claim 13, wherein said means for specifying, said means for determining, and said means for associating comprise software devices.

16. The method of claim 1, further comprising:
performing a determined action by said repository on said item.

17. The system of claim 13, further comprising:
means for performing a determined action by said repository on said item.

18. The system of claim 13, wherein said item includes said item rights expression associated therewith and indicating said manner of use of said item.

19. The system of claim 13, wherein said repository rights expression applies to at least one of all items that said repository processes and all requests for items received by said repository.

20. The system of claim 13, wherein said repository rights expression applies to one collection of specific items that said repository processes and specific requests for items received by said repository.

21. The system of claim 13, further comprising:
means for specifying a plurality of said repository rights expression indicating respective manners of use of said item at said repository; and
means for associating the plural repository rights expressions with said repository of said item.

22. The system of claim 13, wherein said means for specifying a repository rights expression comprises:
means for specifying in said repository rights expression that the item rights expression associated with said item overrules said repository rights expression,
wherein said combination in said means for determining considers said item rights expression overruling said repository rights expression.

23. The system of claim 13, wherein said means for specifying a repository rights expression comprises:
means for specifying in said repository rights expression that said repository rights expression overrules the item rights expression associated with said item,
wherein said combination in said means for determining considers said repository rights expression overruling said item rights expression.

24. The system of claim 13, wherein said item includes a pointer to said repository and said system further comprises:
means for providing said item to said repository based on said pointer.

25. The system of claim 13, wherein said determining means comprises:
means for determining the actions to be taken by said repository based on a characteristic of said item.

26. The system of claim 13, wherein said item includes at least one of digital content, digital goods, digital services, non-digital content, non-digital goods and non-digital services.

27. The method of claim 1, further comprising:
performing an action on said item by said repository that is determined by said step of determining.

28. The method of claim 1, wherein said step of specifying an item rights expression comprises:
specifying in said item rights expression that the repository rights expression associated with said repository overrules said item rights expression,
wherein said combination in said step of determining considers said repository rights expression overruling said item rights expression.

29. The method of claim 1, wherein said step of specifying an item rights expression comprises:
specifying in said item rights expression that said item rights expression overrules the repository rights expression associated with said repository, wherein said combination in said step of determining considers said item rights expression overruling said repository rights expression.

30. The system of claim 13, further comprising:

means for performing an action on said item by said repository that is determined by said means for determining.

31. The system of claim 13, wherein said means for specifying an item rights expression comprises:

means for specifying in said item rights expression that the repository rights expression associated with said repository overrules said item rights expression, wherein said combination in said means for determining considers said repository rights expression overruling said item rights expression.

32. The system of claim 13, wherein said means for specifying an item rights expression comprises:

means for specifying in said item rights expression that said item rights expression overrules the repository rights expression associated with said repository, wherein said combination in said means for determining considers said item rights expression overruling said repository rights expression.

* * * * *